United States Patent [19]

Konishi et al.

[11] Patent Number: 5,266,093
[45] Date of Patent: Nov. 30, 1993

[54] GLASS BOTTLE FORMING MACHINE

[75] Inventors: Masahiro Konishi, Ichinomiya; Yoshiyuki Nomura, Anjou; Kuniharu Mitsuki, Nagoya; Masao Kajino, Nagoya; Takashi Yoshida, Nagoya; Hiroto Sakakibara, Takahama; Noriyuki Ogawa, Tayota; Ui: Motohisa, Higashikamo, all of Japan

[73] Assignees: Ishizuka Glass Co., Ltd.; NSD Corporation, both of Nagoya, Japan

[21] Appl. No.: 799,393

[22] Filed: Nov. 26, 1991

[30] Foreign Application Priority Data

Nov. 28, 1990 [JP] Japan ............................ 2-322504

[51] Int. Cl.$^5$ ............................................. C03B 7/08
[52] U.S. Cl. ........................................ 65/158; 65/163; 65/164; 65/207
[58] Field of Search ............ 65/158, 160, 163, 164, 65/162, 221, 207

[56] References Cited

U.S. PATENT DOCUMENTS

| | | | |
|---|---|---|---|
| 4,165,975 | 8/1979 | Kwiatkowski | 65/158 |
| 4,369,053 | 1/1983 | Becker | 65/158 |
| 4,375,669 | 3/1983 | Johnson | 65/163 |
| 4,613,352 | 9/1986 | Krumme | 65/158 |
| 4,708,729 | 11/1987 | Cardenas | 65/163 |
| 4,772,306 | 9/1988 | Davey | 65/304 |
| 4,961,773 | 10/1990 | Takahara | 65/334 |

OTHER PUBLICATIONS

Webster's New World Dictionary, Simon & Schuster, 1988 p. 1224.

Primary Examiner—W. Gary Jones
Attorney, Agent, or Firm—Graham & James

[57] ABSTRACT

There is provided a plunger position detector for detecting a linear position of a plunger used for forming a parison over the entire range of moving of the plunger. Since there is correlation between the plunger position and the gob weight, the gob weight can be detected in response to an output signal of this detector and, in accordance with this detection, a gob forming operation is controlled to an optimum state so that the gob weight will become a predetermined weight. Since difference in center positions between a blank mold for forming a parison and the plunger causes variation in the state of movement of the plunger, this difference in the center positions can be detected in response to a plunger position detection signal and, in accordance with this detection, an optimum registering of the center positions can be performed.

24 Claims, 10 Drawing Sheets

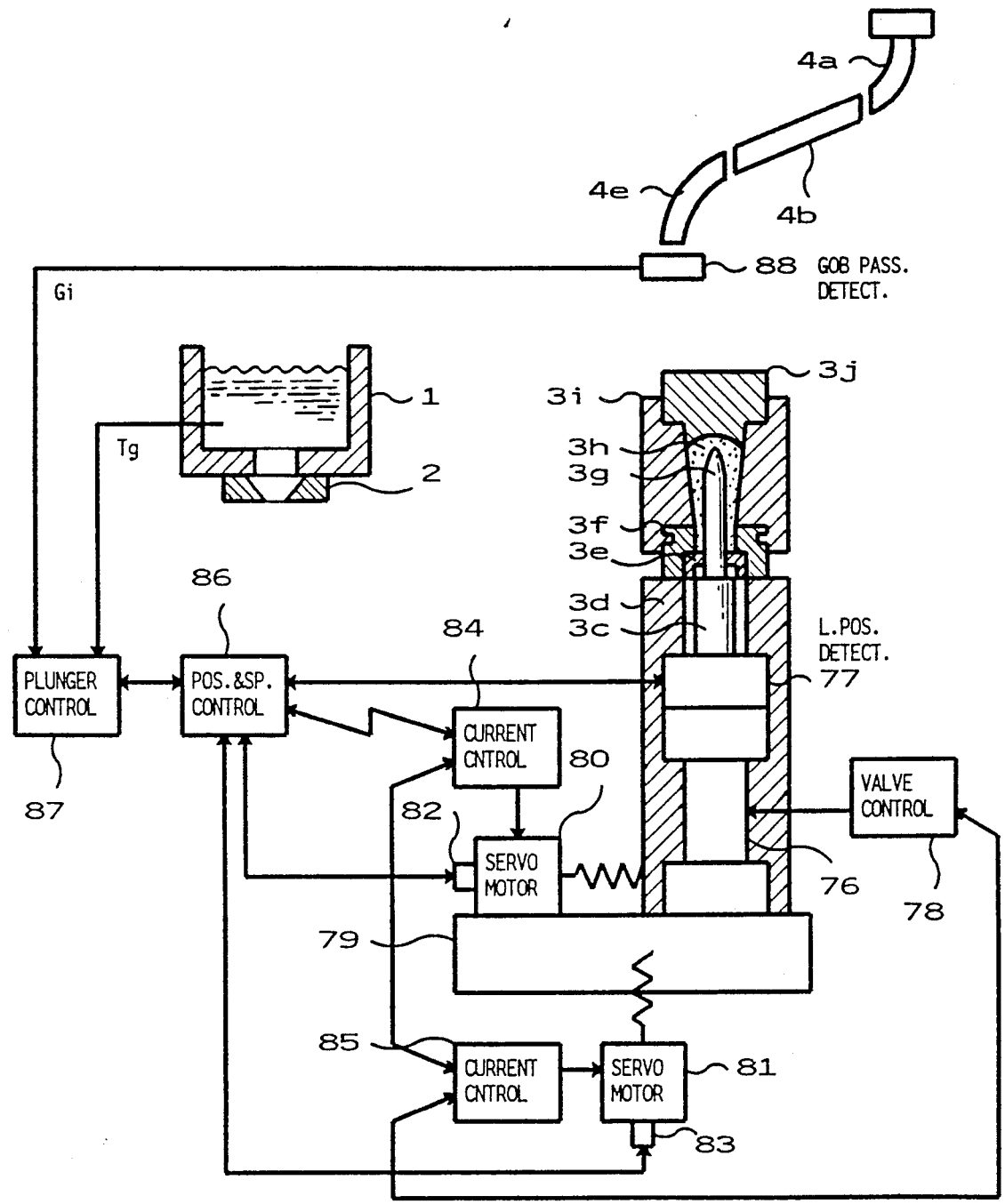
F I G. 4

GLASS BOTTLE FORMING MACHINE

BACKGROUND OF THE INVENTION

This invention relates to a glass bottle forming machine of a press blow type which forms a parison by pressing gob produced from molten glass and forming a glass bottle of a desired shape by subjecting this parison to a blow processing.

Known in the art of glass bottle forming machines producing glass bottles in a large scale is a glass bottle forming machine of an independent section type (IS type) having forming sections of a press blow type.

Each forming section of this IS type glass bottle forming machine includes parison forming means for forming a parison by pressing gob by a plunger mechanism and blow mold forming means for forming this parison into a glass bottle of a desired shape by the blow processing.

A glass bottle formed in each forming section including the parison forming means and blow mold forming means passes through annealing furnace one by one and thereby is finished to a final glass bottle. A check is made at the outlet of the annealing furnace to examine whether there is a defect in the finished bottle or not and a glass bottle having a defect is removed out of the line.

A defect occurring during manufacture of glass bottles is mostly ascribable to variation in the weight of a gob supplied to each forming section during forming of a parison. Therefore, by preventing variation in the weight of a gob and controlling the weight of a gob supplied to each forming section to a constant value, occurrence of defective glass bottles can be held to the minimum.

As a glass bottle forming machine capable of preventing variation in the weight of a gob, there is one disclosed in Japanese Patent Publication No. 59-43426. According to this glass bottle machine, the maximum stroke value of a plunger which applies a predetermined pressure to a gob in a blank mold to form a parison is detected by a sensor such as a differential transformer, the weight of a gob is calculated from the maximum stroke value and the height of clay tube is automatically controlled so as to maintain the weight of a gob at a constant value. As another glass bottle forming machine for controlling the weight of a gob to a constant value, there is one disclosed in Japanese Patent Publication No. 1-242425.

The value of maximum stroke of a plunger during press forming depends upon temperature of molten glass stored in a spout before forming of a gob, i.e., temperature of a gob in a blank mold, for specific gravity of a gob differs depending upon the temperature of the gob and, accordingly, difference in absolute volume arises in the same weight of gob.

Accordingly, in a case where a gob of the same weight is set in a blank mold and the maximum stroke value of the plunger during forming of a parison is detected, the maximum stroke value of a gob which is of a higher temperature is smaller than the maximum stroke value of a gob which is of a lower temperature. It is therefore difficult to maintain the weight of the gob at a constant value by detecting, as in the prior art glass forming machine, the maximum stroke value of the plunger and controlling the height of the clay tube on the basis of the detected value.

Defects occur during manufacture of glass bottles not solely due to the above described variation in the weight of a gob but also due to an error in the timing of pressing by the plunger during forming of a parison and an error between center positions of the plunger and the blank mold. Accordingly, it is difficult to effectively prevent occurrence of defects in glass bottles even if the variation in the weight of a gob is prevented and the weight of a gob supplied to each forming section is maintained at a constant value, unless the timing of pressing by the plunger and also the center positions of the plunger and the blank mold are controlled to optimum values.

SUMMARY OF THE INVENTION

It is, therefore, an object of the invention to provide a glass bottle forming machine capable of eliminating causes of defects occurring during manufacture of glass bottles in the stage of forming of a parison.

For achieving the above described object of the invention, the glass bottle forming machine according to the first aspect of the invention comprises gob forming means for forming a gob by pushing molten glass in a spout out of an orifice by means of a pushing member which is moved linearly in a tube and cutting the pushed out glass with shears, gob distribution means for distributing the gob which has been formed by the gob forming means to a plurality of glass bottle forming sections, and parison forming means provided for each of the glass bottle forming sections for forming the distributed gob to a parison by pressing the distributed gob to a blank mold by means of a plunger characterized in that said glass bottle forming machine further comprises plunger position detection means for detecting a linear position of the plunger over entire range of moving thereof, gob weight detection means for detecting the weight of the gob which has been distributed to the parison forming means in response to a signal representing the linear position of the plunger during the pressing process, and gob weight control means for controlling the gob forming means so that the gob weight which has been detected by the gob weight detection means becomes a predetermined weight.

The glass bottle forming machine according to the second aspect of the invention comprises gob forming means for forming a gob by pushing molten glass in a spout out of an orifice by means of a pushing member which is moved linearly in a tube and cutting the pushed out glass with shears, gob distribution means for distributing the gob which has been formed by the gob forming means to a plurality of glass bottle forming sections, and parison forming means provided for each of the glass bottle forming sections for forming the distributed gob to a parison by pressing the distributed gob to a blank mold by means of a plunger characterized in that said glass bottle forming machine further comprises plunger position detection means for detecting a linear position of the plunger over entire range of moving thereof, position error detection means for detecting difference between center positions of the blank mold of the parison forming means and the plunger on the basis of an output from the plunger position detection means, and position registering means for registering the center positions of the blank mold and the plunger to eliminate the difference in the center positions.

The glass bottle forming machine according to the third aspect of the invention comprises gob forming means for forming a gob by pushing molten glass in a spout out of an orifice by means of a pushing member which is moved linearly in a tube and cutting the pushed out glass with shears, gob distribution means for distributing the gob which has been formed by the gob forming means to a plurality of glass bottle forming sections, and parison forming means provided for each of the glass bottle forming sections for forming the distributed gob to a parison by pressing the distributed gob to a blank mold by means of a plunger characterized in that said glass bottle forming machine further comprises gob-in detection means for detecting that the gob has been supplied from the gob distribution means to the parison forming means and the pressing by the plunger is started upon lapse of a predetermined length of time from generation of a detection signal from the gob-in detection means.

The glass bottle forming machine according to the fourth aspect of the invention comprises gob forming means for forming a gob by pushing molten glass in a spout out of an orifice by means of a pushing member which is moved linearly in a tube and cutting the pushed out glass with shears, gob distribution means for distributing the gob which has been formed by the gob forming means to a plurality of glass bottle forming sections, and parison forming means provided for each of the glass bottle forming sections for forming the distributed gob to a parison by pressing the distributed gob to a blank mold by means of a plunger characterized in that said glass bottle forming machine further comprises plunger position detection means for detecting a linear position of the plunger over entire range of moving thereof, and plunger control means for inputting a plunger linear position signal from the plunger position detection means and a plunger target position signal, and driving and controlling the plunger on the basis of comparison of these input signals.

In view of the fact that most defects during manufacture of glass bottles occurs in the process from gob forming and parison forming in a glass bottle forming machine which generally includes the gob forming means, gob distribution means, parison forming means and blow mold forming means, the invention in its first, second, third and fourth aspects thereof has improved the gob forming means, gob distribution means and parison forming means.

The gob forming means forms a gob by pushing molten glass in the spout out of the orifice by the pushing member moving linearly in the tube and cutting the pushed out glass by the shears. The gob distribution means distributes the gob which has been formed by the gob forming means to the plural glass bottle forming sections. The parison forming means is provided for each of the glass bottle forming sections and forms the distributed gob into a parison by pressing it to the blank mold by the plunger.

According to the first aspect of the invention, the plunger position detection means detects the linear position of the plunger over the entire range of its moving and thereby can detect a maximum stroke value of the plunger and also speed of pressing during the pressing process by the plunger. Since the temperature of the gob in the blank mold can be detected relatively on the basis of this speed of pressing during the pressing process, the gob weight detection means can calculate the maximum stroke value of the plunger during the pressing process and the temperature of the gob in the blank mold on the basis of the plunger linear position signal during the pressing process and thereby detect the weight of the gob which has been distributed to the parison forming means. The gob weight control means controls the gob forming means so that the weight of the gob which has been detected by the gob weight detection means becomes a predetermined weight. Thus, a gob of a constant weight can be always formed and supplied to the parison forming means notwithstanding variation in the temperature of molten glass in the spout. The gob weight control means controls factors such as the height of the tube from the spout bottom surface, moving position of the pushing member, timing of cutting by the shears.

According to the second aspect of the invention, the plunger position detection means detects the state of movement of the plunger during the pressing process by detecting the linear position of the plunger over the entire range of its moving. When the center positions of the blank mold and the plunger coincide with each other, the state of movement of the plunger is smooth and no variation is produced. When there is difference in the center positions, variation is produced in the state of movement of the plunger. The position error detection means therefore can detect difference in the center positions between the blank mold and the plunger on the basis of the linear position signal from the plunger position detection means. The position registering means registers the center positions of the blank mold and the plunger so as to eliminate the difference in the center positions detected by the position error detection means. Defects occurring during manufacture of glass bottles due to difference in the center positions can thereby be reduced to a large extent. The position registering means registers the center positions of the blank mold and the plunger by moving the plunger on a plane perpendicular to the moving direction of the plunger.

Since the gob which has been supplied from the gob distribution means to the parison forming means is high in temperature and low in viscosity, the gob tends to enter space between the blank mold and the plunger. When an excessive amount of the gob enters this space, this causes a defect in the manufacture of glass bottles. According to the third aspect of the invention, therefore, the gob-in detection means detects time when the gob from the gob distribution means has been set in the parison forming means, i.e., the blank mold, and the pressing by the plunger is started upon lapse of a predetermined length of time from generation of the detection signal. By this arrangement, the pressing process can be carried out when the amount of gob entering the space between the blank mold and the plunger has reached an optimem amount and the timing of pressing by the plunger can be controlled to an optimum timing. As the gob-in detection means, the amount of passage of the gob supplied from the gob distribution means to the parison forming means may be optically detected or, alternatively, the plunger position detection means for detecting the linear position of the plunger over the entire range of moving thereof may be provided and the gob-in detection may be made on the basis of the change in the position of the plunger when the gob has been supplied.

According to the fourth aspect of the invention, the plunger position detection means detects the linear position of the plunger over the entire range of moving thereof. The plunger control means positively drives and controls the plunger in accordance with comparison of the detection signal from the plunger position detection means with the plunger target position signal representing the moving position of the plunger. That is, according to the fourth aspect of the invention, not only the linear position of the plunger is detected and the gob forming means and the parison forming means are controlled on the basis of the detection signal as in the first, second and third aspects of the invention, but the moving state of the plunger per se is driven and controlled in accordance with the target position signal. An ideal target position signal corresponding to the shape of the glass bottle (shape of the blank mold), weight of the gob, gob temperature and other factors can be supplied to the plunger control means and the moving state of the plunger can thereby be controlled to an optimum state and the cause of defect occurring during manufacture of glass bottles can be eliminated in the stage of forming of a parison.

A preferred embodiment of the invention will now be described with reference to the accompanying drawings.

BRIEF DESCRIPTION OF THE DRAWINGS

In the accompanying drawings,

FIG. 4 is a diagram showing a specific construction of the parison forming section and plunger control system of FIG. 1;

DESCRIPTION OF A PREFERRED EMBODIMENT

Figure 1:
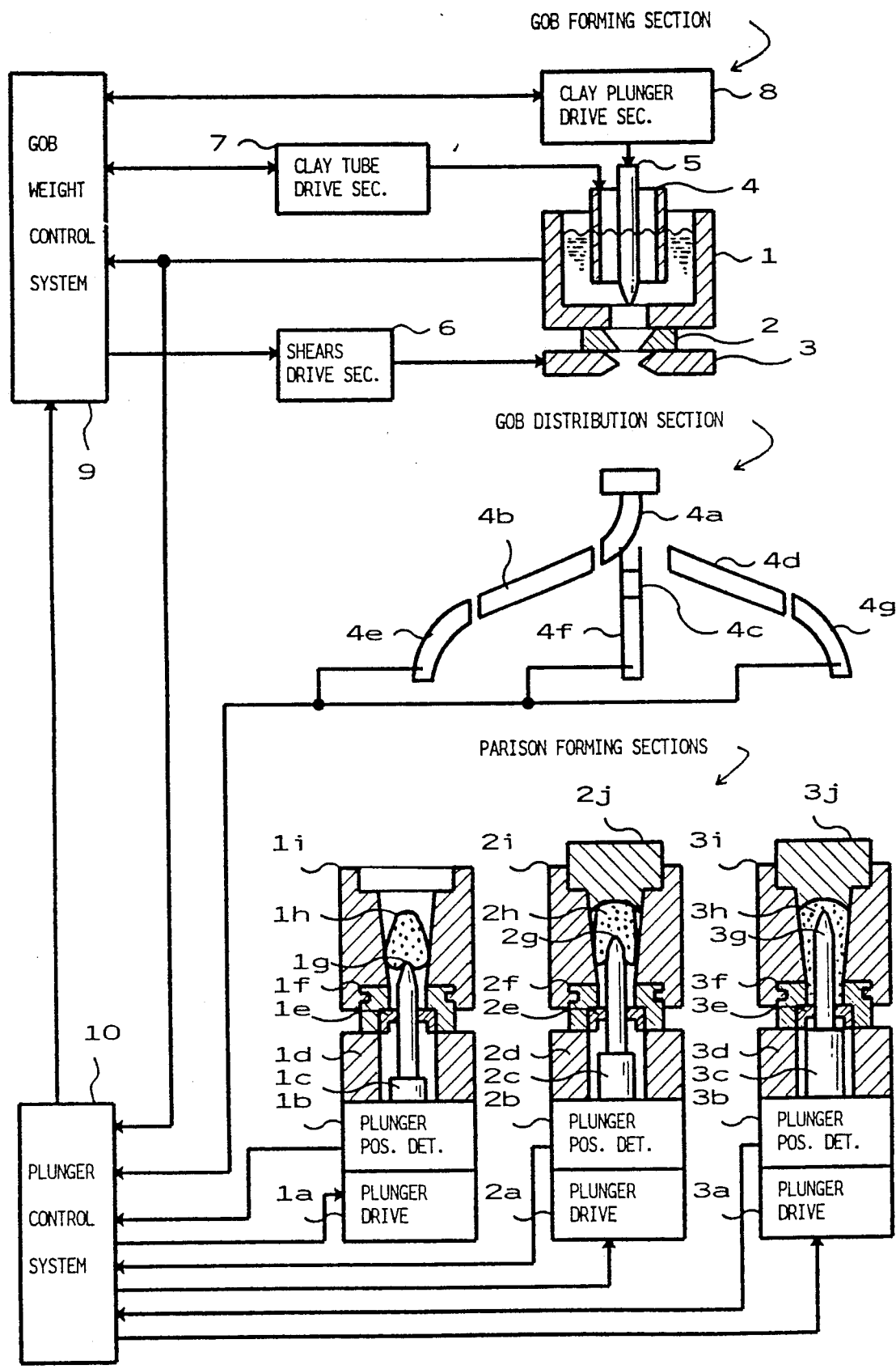
FIG. 1 is a diagram schematically showing an entire structure of the glass bottle forming machine according to the invention.

FIG. 1 schematically shows the entire structure of the glass bottle forming machine of the invention. In the present embodiment, the gob forming section, gob distribution section and three parison forming sections are shown. Illustration of the blow mold forming section is omitted.

First, the construction of the gob forming section which forms a gob of a predetermined weight one after another will be described.

A spout 1 is a reservoir for storing molten glass. The spout 1 constantly stores molten glass of a predetermined amount or over for supplying gobs continuously to the parison forming section. When the amount of molten glass in the spout 1 has fallen below the predetermined amount, new supply of molten glass is made from a molten glass furnace (not shown).

The temperature of molten glass and the height of the surface level of molten glass in the spout 1 change greatly during supply of molten glass from the furnace. The height of the surface level of molten glass in the spout 1 is gradually reduced as supply of gobs proceeds. In the present embodiment, a thermocouple is provided in the spout 1 for measuring temperature Tg of the molten glass in the spout 1 and a liquid level sensor utilizing a float is provided on an inner wall of the spout 1 for measuring height Hg of the surface level of the molten glass. Illustration of these sensors is schematical in FIG. 2 where lines labeled Hg and Tg are shown. When the height Hg of the surface level from the liquid level sensor falls below the predetermined level, molten glass is newly supplied from the furnace.

An orifice 2 determines the diameter of molten glass which is pushed out of the spout 1 and is provided below the outlet of the spout 1. By changing the diameter of this orifice 2, the diameter of a gob can be determined at a desired value. In the present embodiment, a single orifice having a single opening is shown. A double orifice having two openings may also be used as desired.

Shears 3 cut the molten glass pushed out of the orifice 2 and thereby determine the length of each gob. By adjusting, therefore, the timing of cutting of the molten glass by the shears 3, the weight of the gob can be controlled.

In a case where a double orifice is used for the orifice 2, the shears 3 are provided for each opening of the double orifice and the gob cutting timing of each shears 3 for the respective openings is separately controlled. In the case of using the double orifice for the orifice 2, the same amount of molten glass must be pushed out of the two openings. When center positions of the double orifice, clay tube 4 and clay plunger 5 are not aligned with one another, amounts of molten glass pushed out of the two openings of the double orifice differ from each other. Therefore, the same weight of gob can be formed from molten glass pushed out of the two openings by separately controlling the timing of cutting molten glass by the shears 3.

The clay tube 4 adjusts the flow of molten glass in the spout 1 to the orifice 2 in accordance with the height of the spout 1 from the bottom surface and thereby controls the amount of molten glass pushed out of the orifice 2. The clay tube 4 is rotated at a predetermined speed for homogenizing the molten glass and averaging the temperature of the molten glass. Accordingly, by gradually raising the height of the clay tube 4, the weight of a gob increases gradually and, conversely, by gradually lowering the height of the clay tube 4, the weight of a gob decreases gradually. In the case of using a double orifice for the orifice 2, it is necessary to align the center position of the double orifice with the center position of the clay tube 4 for ensuring that the same amount of molten glass will be pushed out of each opening of the double orifice.

The clay plunger 5, i.e., the pushing member, is moved in a linear reciprocating motion along the axis of rotation of the clay tube 4. The clay plunger 5 controls the diameter of molten glass pushed out of the orifice 2 in accordance with the position and speed of this linear reciprocating movement. More specifically, by increasing the moving speed of the clay plunger 5, the diameter of molten glass increases and by decreasing the moving speed of the clay plunger 5, the diameter of molten glass decreases. Therefore, a portion of a large diameter and a portion of a small diameter are formed in the molten glass and the small diameter portion is cut by the shears 3. In the case of using a double orifice for the orifice 2, it is necessary to align the center position of the double orifice with the center position of the clay plunger 5 to ensure that the same amount of molten glass will be pushed out of each opening of the double orifice.

The shears 3 are driven by a shears drive section 6, the clay tube 4 is driven by a clay tube drive section 7 and the clay plunger 5 is driven by a clay plunger drive section 8, respectively. Specific construction of these drive sections 6, 7 and 8 will be described later.

A gob weight control system 9 inputs a plunger current position signal from a plunger control system 10, and temperature Tg of the molten glass and height Hg of the surface level of the molten glass from sensors provided in the spout 1, and outputs a control signal in accordance with values of these input signals to the respective drive devices (i.e., the shears drive section 6, the clay tube drive section 7 and the clay plunger drive section 8) thereby to control the clay tube 4, clay plunger 5 and shears 3.

The gob weight control system 9 can form a gob of a predetermined weight by suitably controlling the height of the clay tube 4 from the bottom surface of the spout 1, the moving speed of the clay plunger 5 and the timing of cutting of the molten glass by the shears 3 in accordance with the temperature Tg and the height Hg of the liquid surface of the molten glass in the spout 1. When the temperature of the molten glass is low, its viscosity is high and, therefore, it is necessary to set the clay tube 4 at a high position and set the moving speed of the clay plunger 5 at a high speed. Conversely, when the temperature of the molten glass is high, its viscosity is low and, therefore, it is necessary to set the clay tube 4 at a low position and set the moving speed of the clay plunger 5 at a low speed. Likewise, when the height Hg of the liquid surface of the molten glass is large, pressure of the molten glass in the vicinity of the opening of the orifice 2 is high and, therefore, it is necessary to set the clay tube 4 at a low position and set the moving speed of the clay plunger 5 at a low speed. Conversely, when the height Hg is small, the pressure of the molten glass is small and, therefore, it is necessary to set the clay tube at a high position and set the moving speed of the clay plunger at a high speed.

Construction of the gob distribution section which distributes gobs which have been formed by the gob forming section to the parison forming section one after another will now be described.

A scoop 4a is rotated to be connected at its tip portion to either one of troughs 4b, 4c and 4d. The gob of the predetermined weight which has been provided by cutting the molten glass by the shears 3 is supplied to the troughs 4b, 4c and 4d in turn as the scoop 4a is rotated. The troughs 4b, 4c and 4d respectively have a rail-like shape having an upwardly opening channel of a C-shaped cross section. A gob supplied from the scoop 4a slides along this channel. Deflectors 4e, 4f and 4g are of a similar structure to the troughs 4b, 4c and 4d and have downwardly directed channels. Gobs sliding down the troughs 4b, 4c and 4d are led to the respective parison forming sections through these channels of the deflectors 4e, 4f and 4g.

A gob-in detection section (not illustrated) is provided in the lower portions of the deflectors 4e, 4f and 4g for detecting passage of gobs and providing a detection signal (i.e., gob-in signal) Gi to the plunger control system 10 each time a gob has passed the deflectors 4e, 4f and 4g.

Construction of the parison forming section will now be described. Since the construction of respective forming sections in the parison forming section is the same, construction of a parison forming section on the right side as viewed in FIG. 1 only will be described and description of the other parison forming sections will be omitted.

Each parison forming section has a guide ring 3e, a neck ring 3f, a blank mold 3i, a baffle plate 3j and a plunger 3g. These component parts are connected tightly together to form an integral body having a space of a predetermined shape. Accordingly, by supplying a gob 3h to the space defined by the guide ring 3e, neck ring 3f, blank mold 3i and baffle plate 3j and pressing the gob 3h by the plunger 3g, the gob 3h is formed into a parison of a predetermined shape.

The guide ring 3e has an aperture of the same diameter as the diameter of the plunger 3g and performs a sealing function to prevent flow of the gob 3h from the parison forming section to a plunger drive section 3a when the plunger 3g is reciprocated.

The neck ring 3f is a mold which surrounds the guide ring 3e and defines a space between the plunger 3g to from a neck portion of a glass bottle. The neck ring 3f is composed of two mold halves of a symmetrical shape. The neck ring 3f has also a function of transferring the formed parison to the blow mold forming section.

The plunger 3g is connected to a cylinder rod 3c. The cylinder rod 3c is moved linearly (i.e., vertically) by the plunger drive section 3a. An absolute position of the cylinder rod 3c over the entire range of moving thereof is detected by a plunger position detection section 3b. Accordingly, the amount of movement of the plunger 3g by the movement of the cylinder rod 3c, i.e., the current position of the plunger 3g, is detected by the plunger position detection section 3b and supplied to the plunger control system 10. The plunger drive section 3a is controlled by a control signal from the plunger control system. Specific construction of the plunger control system 10, plunger drive section 3a and plunger position detection section 3b will be described later.

The gob 3b is supplied from the gob distribution section provided above each parison forming section and has the predetermined weight necessary for forming a glass bottle.

The blank mold is a mold which surrounds the neck ring 3f and is connected closely thereto and forms a parison of a smooth shape in association with the neck ring 3f. The blank mold 3i is composed, as the neck ring 3f, of two separable mold halves of a symmetrical shape. F The baffle plate 3j is connected closely to the upper portion of the blank mold 3i to close the gob 3h in the blank mold 3i.

The operation of the parison forming section will now be described.

As illustrated, a guide ring 1e, neck ring 1f and blank mold 1i are closely connected together to form a space of a predetermined shape. A plunger 1g rises and stops at a middle position (loading position) in the space and holds a gob 1h supplied from the gob distribution section (this is the state of the left side forming section as viewed in FIG. 1). After holding a gob 2h, a baffle plate 2j covers the upper portion of a blank mold 2i. The gob 2h flows in the space in the blank mold 2i (this is the state of the center forming section as viewed in FIG. 1). By lowering of the plunger 3g, a parison of a predetermined shape is formed in the blank mold 2i. Then, the blank mold 3i is separated to the two mold halves and the neck ring 3f is transferred to the blow mold for the blow forming (not shown) while holding the neck portion of the parison formed by the pressing process. After transferring the parison to the blow forming section, the neck ring 3f is separated to the two mold halves and returns to the original position on the side of the parison forming section. Each forming section of the parison forming section carries out the above described operation.

Figure 2:
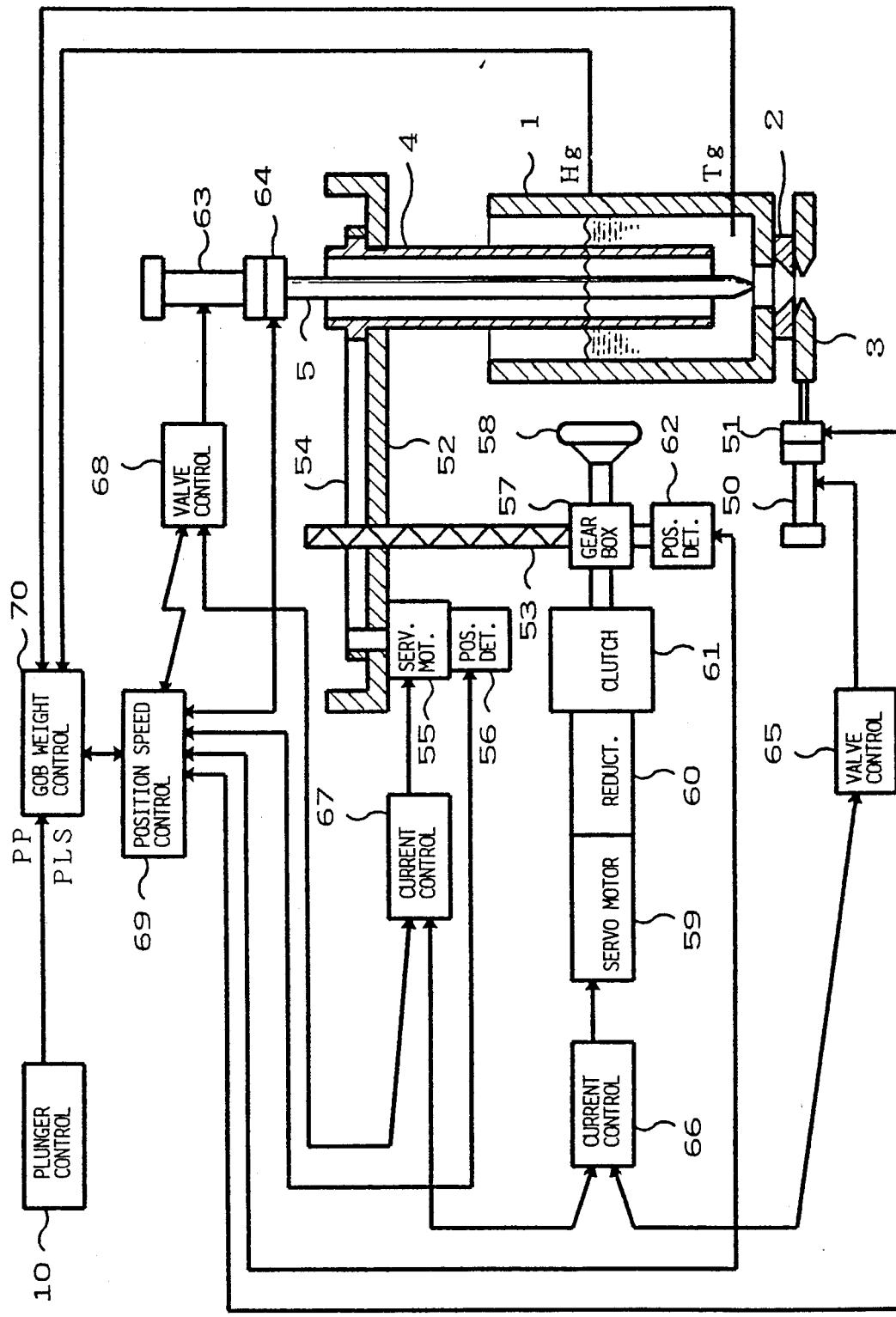
FIG. 2 is a diagram showing a specific construction of the gob forming section shown in FIG. 1.

FIG. 2 shows a specific construction of the gob forming section of FIG. 1. In FIG. 2, the same component parts as those in FIG. 1 are designated by the same reference characters and detailed description thereof will be omitted.

The shears drive section 6 of FIG. 1 includes a hydraulic cylinder 50 and a linear position detection device 51.

The hydraulic cylinder 50 controls the linear position of the cylinder rod through a hydraulic system and includes a cylinder rod, a cylinder and oil chambers provided on both sides thereof. By variably controlling the hydraulic pressure of the oil chambers by means of a servo valve, the cylinder rod is linearly moved.

The cylinder rod is mechanically connected to the shears 3. Therefore, by driving the cylinder rod by hydraulic pressure, the linear movement of the shears 3 can be controlled.

The linear position detection device 51 detects the linear position of the cylinder rod in an absolute value and is incorporated in the hydraulic cylinder 50. Position data of the cylinder rod, i.e., the shears 3, which has been detected by the linear position detection device 51 is applied to a position speed control section 69 of the gob weight control system 9 and is converted to digital position data. Details of this linear position detection device are described in Japanese Utility Model Laid-open Publication No. 57-135917, Japanese Utility Model Laid-open Publication No. 58-136718 and Japanese Utility Model Laid-open Publication No. 59-175105.

The hydraulic cylinder 50 is driven and controlled by a control signal from a valve control section 65. Details of the valve control section 65 will be described later.

The clay tube drive section 7 of FIG. 1 has the following construction.

A tube holder 52 holds the clay tube 4 rotatably at one end thereof and is moved vertically by rotation of a rotary shaft 53.

At the other end of the tube holder 52 is connected a servo motor 55 for rotating the clay tube 4. The servo motor 55 is connected to the clay tube 4 through a belt 54. The clay tube 4 therefore is rotated in synchronism with rotation of the servo motor 55.

As the servo motor 55, a synchronizing type AC servo motor, for example, is used. To the servo motor 55 is connected a rotational position detection device 56 for detecting the current position of the servo motor 55 in an absolute value. As the rotational position detection device 56, a phase-shift type rotational position sensor of an induction type as described in Japanese Patent Laid-open Publication No. 57-70406 or Japanese Patent Laid-open Publication No. 58-106691 is used. The output of the rotational position detection device 56 is applied to a position speed control section 69 and is converted to digital position data.

The rotary shaft 53 adjusts the height of the clay tube 4 from the bottom surface of the spout 1 and moves the tube holder 52 vertically by 1 mm for one rotation of the rotary shaft 53.

A gear box 57 converts rotational forces provided by a handle 58 and a servo motor 59 to rotational force of the rotary shaft 53.

The servo motor 59 is, as the servo motor 55, composed of a synchronizing type AC servo motor and is connected to the gear box 57 through a reduction device 60 and a clutch 61. The reduction device reduces the rotational speed of the servo motor 59 and the clutch 61 on-off controls transmission of the drive force to the gear box 57. Therefore, when the clutch 61 is connected, the drive force of the servo motor 59 is transmitted to the rotary shaft 53 and when the clutch 61 is not connected, the drive force from the handle 58 is transmitted to the rotary shaft 53.

A rotational position detection device 62 is connected to the rotary shaft 53 to detect the rotational position of the rotary shaft 53. As the rotational position detection device 62, a detector of the same construction as the rotational position detection device 56 is used. The output of the rotational position detection device 62 is applied, as the output of the rotational position detection device 56, to a position speed control section 69 and is converted to digital position data.

The servo motor 55 is driven and controlled by a control signal from a current control section 67 and the servo motor 59 is driven and controlled by a control signal from a current control section 66. Details of the current control sections 66 and 67 will be described later.

The clay plunger drive section 8 of FIG. 1 includes a hydraulic cylinder 63 and a linear position detection device 64 for detecting the linear position of a cylinder rod thereof in an absolute value.

The hydraulic cylinder 63 hydraulically controls the linear position of its cylinder rod which is mechanically connected to the clay plunger 5. Therefore, by hydraulically driving the cylinder rod, the speed of the linear reciprocal movement of the clay plunger 5 and other factor can be controlled. A linear position detection device 64 which is of the same construction as the linear position detection device 51 and is incorporated in the hydraulic cylinder 63. Position data of the cylinder rod, i.e., clay plunger 5 detected by the linear position detection device 64 is supplied to a position speed control section 69 of the gob weight control system 9 and is converted to digital position data. The hydraulic cylinder 63 is driven and controlled by a control signal from a valve control section 68. Details of the valve control section 68 will be described later.

The gob weight control system 9 of FIG. 1 includes valve control sections 65 and 68, current control sections 66 and 67, position and speed control section 69 and gob weight control section 70.

The gob weight control section 70 inputs the temperature signal Tg and the liquid surface height signal Hg of the molten glass from the sensors in the spout 1 and current position signals PP representing current positions of plungers 1g, 2g and 3g from the plunger control system 10 and, in response to these signals, supplies control signals for controlling the weight of gob to a constant value, i.e., position designation signals for the shears 3, clay tube 4 and clay plunger 5, to the position and speed control section 69. In the present embodiment, the temperature signal Tg of the molten glass in the spout 1 is detected by a sensor provided in the spout. Alternatively, the temperature of a gob which has been set in the parison may be obtained by arithmetic operation on the basis of the plunger current position signal. Details of this arithmetic operation will be described later.

The position and speed detection section 69 inputs position data from the linear position detection devices 51 and 64 and the rotational position detection devices 56 and 62 and the position designation signals from the gob weight control section 70, obtains differences between the position designation signals and the position data from the respective position detection devices and supplies current designation signals (torque signals) responsive to these differences to the valve control sections 65 and 68 and the current control sections 66 and 67.

The valve control sections 65 and 68 and the current control sections 66 and 67 are multi-point connected with respect to the position and speed control z section 69 through bidirectional communication wiring, receive the current designation signals (torque signals) from the position and speed control section 69 and drives the hydraulic cylinders 50 and 63 and the servo motors 55 and 59 in accordance with these current designation signals.

Figure 3:
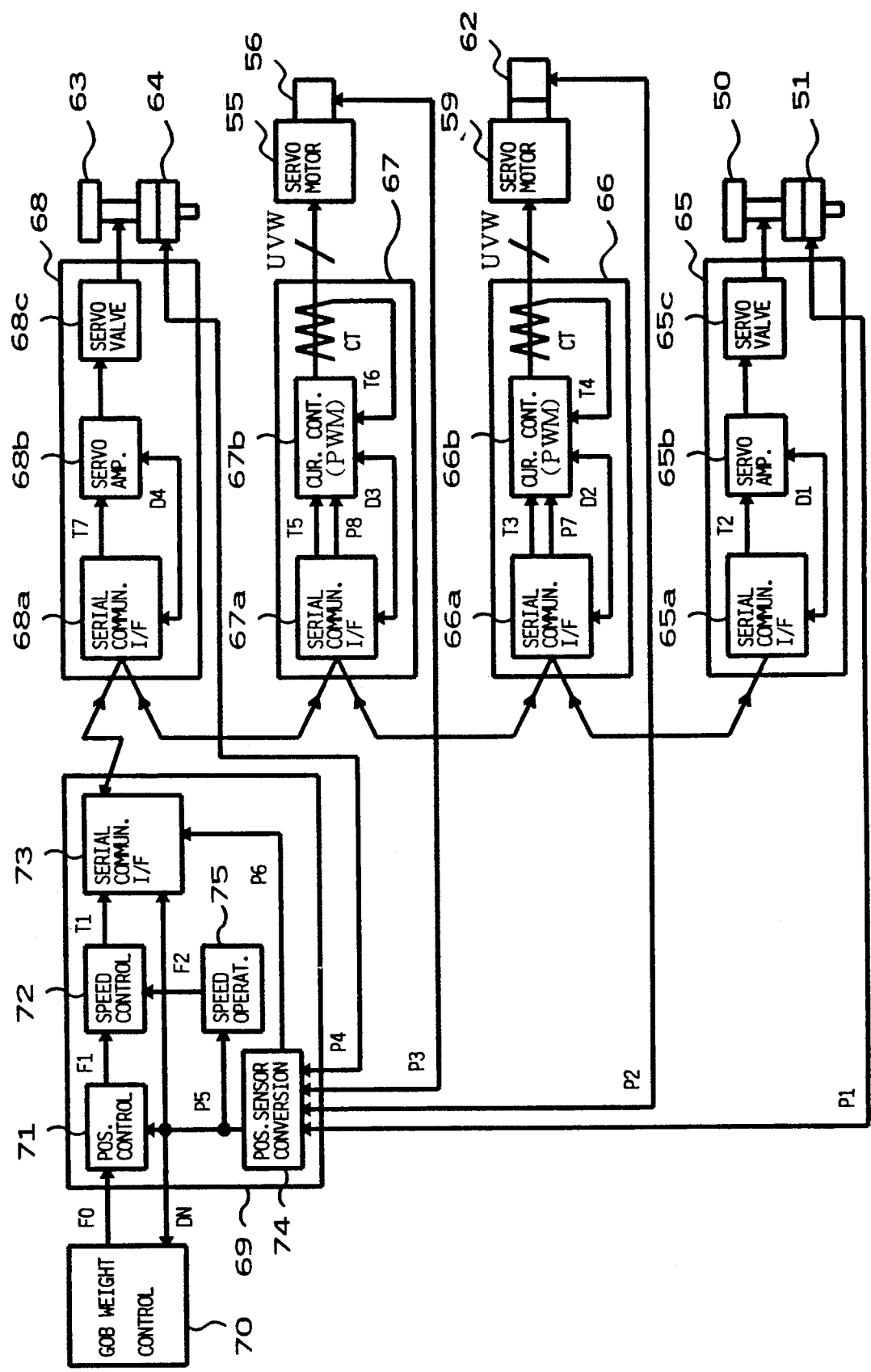
FIG. 3 is a diagram showing a specific construction of the valve control section, current control section and position and speed control section of FIG. 2.

Referring now to FIG. 3, specific construction of the valve control sections 65 and 66, current control sections 66 and 67 and position and speed control section 69 will be described. Since the valve control section 65 is of the same construction as the valve control section 68 and the current control section 66 is of the same construction as the current control section 67, description will be made only about the valve control section 65 and the current control section 66 and description of the valve control section 68 and the current control section 67 will be omitted.

The gob weight control section 70 supplies a position designation signal F0 indicating target positions of the hydraulic cylinder and the servo motor to a position control section 71 of the position and speed control section 69. The gob weight control section 70 is connected to a serial communication interface 73 and thereby exchanges various data DN with the valve control sections 65 and 68 and the current control sections 66 and 67. The gob weight control section 70 is also connected to a position sensor conversion section 74 to input position data P5 representing current positions of the hydraulic cylinders 50 and 63 and servo motors 55 and 59. This arrangement is made to enable the gob weight control section 70 to have rotational position data of the rotary shaft 53 also in the case of manually rotating the rotary shaft 53 by operating the handle 58.

The position and speed control section 69 includes the position control section 71, speed control section 72, serial communication interface 73, position sensor conversion section 74 and speed operation section 75.

The position control section 71 is connected to the gob weight control section 70 and the position sensor conversion section 74 and inputs the position designation signal F0 representing target positions of the hydraulic cylinders 50 and 63 and the servo motors 55 and 59 and the position data P5 representing the current positions of the hydraulic cylinders 50 and 63 and the servo motors 55 and 59.

The position control section 71 connected to the speed control section 72 obtains position difference between the position designation signal F0 and the position data P5 and supplies a speed designation signal F1 corresponding to the position difference to the speed control section 72. The position sensor conversion section 74 produces a phase signal P6 for controlling a switching position of the magnetic field systems of the servo motors 55 and 59 in accordance with signals P3 and P2 from the linear position detection devices 56 and 62 and supplies this phase signal P6 to the serial communication interface 73.

The speed control section 72 is connected to the position control section 71 and the speed operation section 75 and inputs the speed designation signal F1 from the position control section 71 and a speed signal F2 representing the current speed of the hydraulic cylinders 50 and 63 and the servo motors 55 and 56. The speed signal F2 is obtained by converting the position data P5 of the position sensor conversion section 74 by the speed operation section 75. The speed operation section 75 inputs the position data P5 of the position sensor conversion section 74 and operates the moving speed of the cylinder rod of the hydraulic cylinder and the rotational speed of the servo motor by digital operation on the basis of the amount of change in the position data P5 per predetermined unit time.

The speed control section 72 connected to the serial communication interface 73 obtains speed difference between the speed designation signal F1 and the speed signal F2 and supplies a current designation signal (torque signal) T1 corresponding to the speed difference and designating current values for the hydraulic cylinders 50 and 63 and the servo motors 55 and 59 to the serial communication interface 73.

The serial communication interface 73 is connected to the gob weight control section 70, speed control section 72 and position sensor conversion section 74 and transmits the various data DN from the gob weight control section 70 and the current designation signal T1 from the speed control section 72 to serial communication interfaces 65a, 66a, 67a, and 68a of the valve control sections 65 and 68 and the current control sections 66 and 67 through communication wiring. The serial communication interface 73 transmits phase signal P6 from the position sensor conversion section 74 to serial communication interfaces 66a and 67a of the current control sections 66 and 67 through communication wiring. The serial communication interface 73 and the serial communication interfaces 65a, 66a, 67a and 68a are multi-point connected with one another through bidirectional wiring so that the various data DN from the gob weight control section 70 and data D1, D2, D3 and D4 produced in the valve control sections 65 and 68 and the current control sections 66 and 67 are exchanged between the gob weight control section 70 and the valve control sections 66 and 68 and the current control sections 66 and 67.

The valve control section 65 includes the serial communication interface 65a, servo amplifier 65b and servo valve 65c.

The serial communication interface 65a is connected to the serial communication interface 73 of the position and speed control section 69 and the servo amplifier 65b. The serial communication interface 65a receives the current designation signal T1 from the serial communication interface 73 through serial communication interfaces 68a, 67a and 66a and supplies it to the servo amplifier 65b as a current designation signal T2 and also supplies various data D1 including a status signal representing the control state in the servo amplifier 65b to the serial communication interface 73 through the serial communication interfaces 66a, 67a and 68a.

The servo amplifier 65b is connected to the serial communication interface 65a and the servo valve 65c. The servo amplifier 65b inputs the current designation signal T2 and, responsive to this signal, drives a power transistor to supply a drive current to the servo valve 65c.

The serial communication interface 65a is connected with the servo amplifier 65b via a data line so that the various data D1 is exchanged between them.

The servo amplifier 65b has a function of detecting the control state of the hydraulic cylinder 50, i.e., overloading, drop in the power voltage, overcurrent, overvoltage and overheating etc. of the hydraulic cylinder 50. The servo amplifier 65b has a memory for storing data including the servo status signal representing the control state, an ID code representing the specification of the servo amplifier 65b and a cylinder specification code representing the specification of the hydraulic cylinder which is the object of control. The data stored in the memory of the servo amplifier 65b is transmitted, when necessary, to the gob weight control section 70 as the data DN (D1) through the data line and serial communication interfaces 65a, 66a, 67a, 68a and 73.

The cylinder specification code is stored as a table in the memory of the servo amplifier 65b. Therefore, by selecting a table number corresponding to the hydraulic cylinder specification connected through the communication wiring, the servo amplifier 65b can control a hydraulic cylinder of a different specification. By this arrangement, even when the hydraulic cylinder has been replaced, the control system can be converted to one corresponding to the specification of the replaced hydraulic cylinder simply by changing the table number.

The servo valve 65c controls the amount of opening of the valve for supplying hydraulic pressure to the hydraulic cylinder 50 in accordance with the current supplied from the servo amplifier 65b.

The current control section 66 includes the serial communication interface 66a and a current control section 66b.

The serial communication interface 66a is connected to the serial communication interface 73 of the position and speed control section 69 and the current control section 66b. The serial communication interface 66a receives the current designation signal (torque signal) T1 and the phase signal P6 from the serial communication interface 73 through the serial communication interfaces 68a and 67a and supplies these signals as a current designation signal T3 and a phase signal P7 to the current control section 66b and also supplies various data D2 including a status signal representing the control state of the current control section 66b to the serial communication interface 73.

The current control section 66b is connected to the serial communication interface 66a and the servo motor 59. The current control section 66b inputs the current designation signal (torque signal) T3 and a phase signal P7, produces a 3-phase PWM signal to drive a power transistor in response to these signals and supplies a drive current to respective phases (U-phase, V-phase and W-phase) of the servo motor 59. A feedback signal T4 of current value of the U-phase and V-phase thereupon is fed back to the current control section 66b by a current detection isolator CT. The current control section 66b supplies to the servo motor 59 a drive current which is x obtained by amplifying difference between the current designation signal (torque signal) T3 for each phase and the current feedback signal T4 for each phase.

The serial communication interface 66a is connected with the current control section 66b through a data line so that various data D2 is exchanged between them.

The current control section 66b has a function of detecting the control state of the servo motor 59 including overloading, drop in the power voltage, overcurrent, overvoltage and overheating of the servo motor 59. The current control section 66b has also a memory for storing data including a status signal representing the control state and a motor specification code representing the specification of the servo motor which is the object of the control.

The data stored in the memory of the current control section 66b is transmitted, when necessary, as the data DN (D2) to the gob weight control section 70 through the data line and serial communication interfaces 66a, 67a, 68a and 73.

The motor specification code is stored as a table in the memory of the current control section 66b. Therefore, each of the current control sections 66b and 67b detects whether the transmitted data is one for it, reads the data when it is the data for it and performs a control according to the data. In the case of data concerning driving of a servo motor, for example, the current control sections 65b and 67b supply a drive current to the servo motor in accordance with the data. In a case where a table number representing the specification of the servo motor has been transmitted, the drive current for the current control sections of the current control sections 66b and 67b is altered to one corresponding to the specification of the servo motor in accordance with the table number.

In the above described manner, according to the invention, the servo amplifiers 65b and 68b and the current control sections 66b and 67b can be converted to servo amplifiers and current control sections capable of controlling hydraulic cylinders and servo motors of different specifications simply by selecting a table number corresponding to the specifications of the hydraulic cylinders 50 and 63 and the servo motors 55 and 59 connected through the communication wiring. By this arrangement, even when the hydraulic cylinder and servo motor have been replaced, the servo amplifiers and the current control sections can be converted to ones corresponding to the replaced hydraulic cylinder and servo motor simply by changing the table number.

According to the present embodiment, the current designation signal (torque signal) T1, phase data P6 and various data DN can be transmitted simultaneously from the serial communication interface 73 to the serial communication interfaces 65a and 68a of the valve control sections 65 and 68 and the serial communication interfaces 66a and 67a of the current control sections 66 and 67 whereby the hydraulic cylinders 50 and 63 and the servo motors 55 and 59 can be controlled simultaneously.

For performing a synchronized positioning control between the hydraulic cylinders 50 and 63 and the servo motors 55 and 59, the response speed between the position and speed control section 69 and the valve control sections 65 and 68 and also between the current control sections 66 and 67 needs to be in the order of several tens microseconds. For this purpose, the communication system which the inventor of the present invention has previously proposed and is described by the Japanese Patent Application No. 2-49640 may be adopted between the serial communication interfaces 73, 65a, 66a, 67a and 68a.

The operation of the gob weight control system according to the above described embodiment will now be described.

In the gob weight control system shown in FIG. 2, data DN (D1, D2, D3 and D4) of the table number indicating the specifications of the hydraulic cylinders 50 and 63 and the servo motors 55 and 59 is transmitted to the serial communication interfaces 65a and 68a of the valve control sections 65 and 68 and the serial communication interfaces 66a and 67a of the current control sections 66 and 67 through the serial communication interface 73. The transmitted table number data in turn is transmitted to the servo amplifiers 65b and 68b and the current control sections 66b and 67b by the serial communication interfaces 65a, 66a, 67a and 68a. The servo amplifiers 65b and 68b and the current control sections 66b and 67b designate the specifications of the hydraulic cylinders 50 and 63 and the servo motors 55 and 59 and function as the servo amplifiers and current control sections corresponding to the specifications of the hydraulic cylinders 50 and 63 and the servo motors 55 and 59.

The gob weight control section 70 supplies the position designation signal F0 designating target positions of the hydraulic cylinders 50 and 63 and the servo motors 55 and 59 to the position control section 71. The position control section 71 supplies the position designation signal F0 and the speed designation signal F1 based on the position data P5 to the speed control section 72. The speed control section 72 supplies the speed designation signal F1 and the current designation signal (torque signal) T1 corresponding to the speed signal F2 to the serial communication interface 73.

Transmission of signals is made between the serial communication interface 73 and the serial communication interfaces 65a, 66a, 67a and 68a and current designation signals (torque signals) T2, T7, T3 and T5 and the phase signals P7 and P8 are supplied from the serial communication interfaces 65a, 66a, 67a and 68a to the servo amplifiers 65b and 68b and the current control sections 66b and 67b. The servo amplifiers 65b and 68b control drive currents for the servo valves 65c and 68c in response to the current designation signals T2 and T7. The current control sections 66b and 67b control drive currents for the servo motors 55 and 59 in response to the current designation signals (torque signals) T3 and T5 and the current feedback signals T4 and T6 and the phase signals P7 and P8. The outputs P1, P4, P2 and P3 of the linear position detection devices 51 and 64 and the rotational position detection devices 62 and 56 connected to the hydraulic cylinders 50 and 63 and the servo motors 55 and 59 are fed back by the position sensor conversion section 74 of the position and speed control section 69. The position data P5 is fed back to the position control section 71 thereby forming a position loop. The speed signal F2 is fed back to the speed control section 72 thereby forming a speed loop.

The gob weight control section 70 repeats the above described operation to control the movement of the hydraulic cylinders 50 and 63 and the rotation of the servo motors 55 and 59.

In a case where one of such abnormal states as overloading, drop in the power voltage, overcurrent, overvoltage and overheating has occurred in the course of the control, data of the status signal indicating this control state is transmitted from the servo amplifiers 65b and 68b to the gob weight control section 70 through the serial communication interfaces 65a, 66a, 67a, 68a and 73. Responsive to this status signal, the gob weight control section 70 performs a processing corresponding to the type of this status signal.

In a case where it is desired to alter the hydraulic cylinders 50 and 63 and the servo motors 55 and 59 to hydraulic cylinders and servo motors of different specifications, the servo amplifiers and the current control sections can perform the current control corresponding to the hydraulic cylinders and servo motors after alteration simply by transmitting to the servo amplifiers and the current control sections a table number designating the specifications of the hydraulic cylinders and servo motors after the alteration.

FIG. 4 shows a specific construction of the parison forming section and plunger control system 10 of FIG. 1. In FIG. 4, the same components as those in FIG. 1 are designated by the same reference characters and detailed description thereof will be omitted. Since the parison forming sections have the same construction, the right side one in the figure only will be described.

The plunger drive section for performing the linear movement of the plunger 3g and registering of the center positions between the plunger 3g and the blank mold has the following construction.

A hydraulic cylinder 76 has a cylinder rod 3c, a cylinder and oil chambers provided on both sides of the cylinder and causes the cylinder rod 3c to move in a linear movement by variably controlling the hydraulic pressure in the oil chambers through a servo valve. The cylinder rod 3c is mechanically connected to the plunger 3g. Therefore, by hydraulically driving the cylinder rod 3c, the linear movement of the plunger 3b can be controlled.

A linear position detection device 77 detects the linear position of the cylinder rod 3c in an absolute value. The detection device 77 is incorporated in the hydraulic cylinder 76 and is of the same construction as the linear postion detection devices 51 and 64 in FIG. 2. Position data of the cylinder rod 3c, i.e., the plunger 3g, which has been detected by the linear position detection device 77 is supplied to the plunger control system 10 and is converted to digital position data. The hydraulic cylinder 76 is driven and controlled by a control signal from a valve control section 78. Details of the valve control section 78 will be described later.

A housing 3d enclosing the hydraulic cylinder 76 is provided so that it can move in X direction on a table 79. A servo motor 80 is connected to the housing 3d through a ball screw. Accordingly, the plunger 3g moves in X direction with the housing 3d as the servo motor 80 is rotated. The table 79 is provided so that it can move in Y direction. Since a servo motor 81 is connected to the table 79 through a ball screw, the table 79 moves in Y direction as the servo motor 81 is rotated. Accordingly, by driving and controlling the servo motors 80 and 81, the hydraulic cylinder 76 and the plunger 3g can be moved as desired on an X-Y plane which is perpendicular to the direction of the linear movement of the plunger 3g whereby registering of the center positions of the plunger and the blank mold can be made easily.

As the servo motors 80 and 81, synchronizing type AC servo motors, for example, are used. To the servo motors 80 and 81 are connected rotational position detection devices 82 and 83 for detecting current positions of the servo motors 80 and 81 in absolute values. As the rotational position detection devices 82 and 83, phase shift type rotational position sensors of the same type as the rotational position detection devices 56 and 62 of FIG. 2 are used. Outputs of the rotational position detection devices 82 and 83 are applied to a position and speed control section 86 and is converted to digital position data.

The servo motor 80 is driven and controlled by a control signal from a current control section 84 and the servo motor 81 is driven and controlled by a control signal from a current control section 85. Details of the current control sections 84 and 85 will be described later.

The plunger control system of FIG. 1 includes the valve control section 78, current control sections 84 and 85, position and speed control section 86 and plunger control section 87.

The plunger control section 87 inputs the temperature signal Tg of molten glass from the sensor provided in the spout 1 and the gob-in signal Gi from a gob passage detection section 88 and also inputs current position signals representing current positions of the plunger 1g, 2g and 3g and, in accordance with these input signals, controls the operation timing of the plungers 1g, 2g and 3g and registering of the center positions between the plungers 1g, 2g and 3g and blank molds 1i, 2i and 3i.

The plunger control section 87 supplies position designation signals of the servo motors 80 and 81 and the plunger 3g to the position and speed control section 86. In the present embodiment, the temperature signal Tg of the melting glass in the spout 1 is detected by a sensor. Alternatively, the temperature of a gob which has been set in a blank mold may be obtained by arithmetic operation on the basis of the plunger current position signal. The specific control operation of the plunger control section 87 will be described later.

The position and speed control section 86 inputs position data from the linear position detection device 77 and the rotational position detection devices 82 and 83 and the position designation signal from the plunger control section 87, obtains position difference between the position designation signal and position data from the respective detection devices and supplies a current designation signal (torque signal) corresponding to each position difference to the valve control section 78 and the current control sections 84 and 85.

The valve control section 78 and the current control sections 84 and 85 are multi-point connected with respect to the position and speed control section 86 through bidirectional communication wiring and input the current designation signal (torque signal) from the position and speed control section 86 and drives the hydraulic cylinder 76 and the servo motors 80 and 81 in response to the current designation signal.

Figure 5:
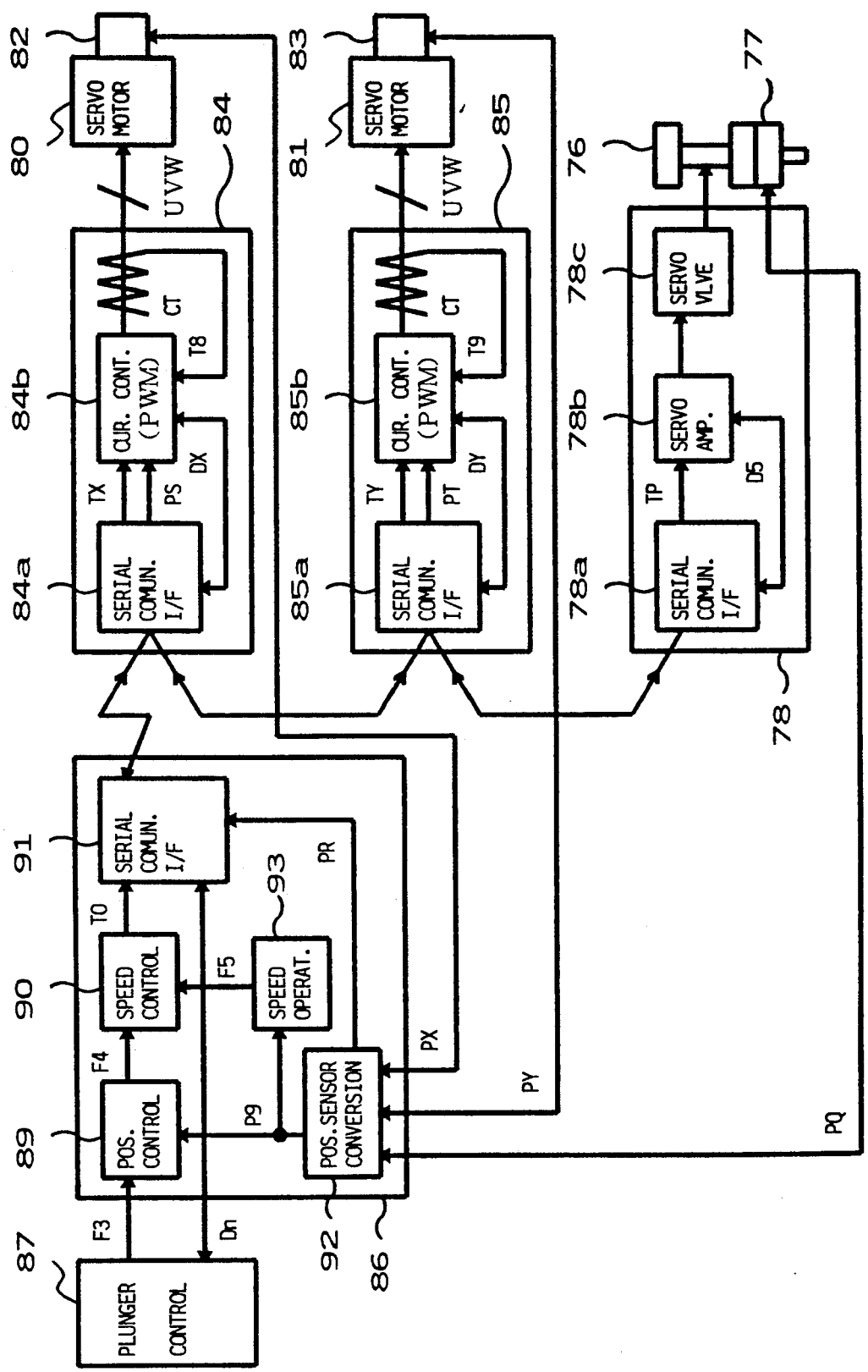
FIG. 5 is a diagram showing a specific construction of the valve control section, current control section and position and speed control section of FIG. 4.

Referring now to FIG. 5, specific construction of the valve control section 78, current control sections 84 and 85, and position and speed control section 86 will be described.

The plunger control section 87 supplies a position designation signal F3 representing a target position of the hydraulic cylinder and the servo motor to a position control section 89 of the position and speed control section 86. The plunger control section 87 is connected to a serial communication interface 91 and various data Dn from the plunger control section 87 is supplied to the valve control section 78 and the current control sections 84 and 85 through serial communication interfaces 91, 84a, 85a and 78a.

The position and speed control section 86 includes the position control section 89, speed control section 90, serial communication interface 91, position sensor conversion section 92 and speed operation section 93.

The position control section 89 is connected to the plunger control section 87 and a position sensor conversion section 92 and inputs the position designation signal F3 representing the target positions of the hydraulic cylinder 76 and the servo motors 80 and 81 and position data P9 representing current positions of the hydraulic cylinder 76 and the servo motors 80 and 81.

The position control section 89 is connected to the speed control section 90, obtains difference between the position designation signal F3 and the position data P9 and supplies a speed designation signal F4 corresponding to the position difference to the speed control section 90. The position sensor conversion section 92 produces a phase signal PR for controlling the switching position of the magnetic field system of the servo motors 80 and 81 on the basis of a signal PQ from the linear position detection device 76 and supplies this signal PR to the serial communication interface 91.

The speed control section 90 is connected to the position control section 89, speed operation section 93 and serial communication interface 91 and inputs the speed designation signal F4 from the position control section 89 and a speed signal F5 representing current speeds of the hydraulic cylinder 76 and the servo motors 80 and 81. The speed signal F5 is obtained by converting the position data P9 of the position sensor conversion section 92 by the speed operation section 93. The speed operation section 93 inputs the position data P9 of the position sensor conversion section 92 and calculates the speed of movement of the cylinder rod of the hydraulic cylinder and the speed of rotation of the servo motor by digital operation based on the amount of change in the position data P9 per predetermined unit time.

The speed control section 90 is connected to the serial communication interface 91, obtains speed difference between the speed designation signal F4 and a speed signal F5 and supplies a current designation signal (torque signal) TO for the hydraulic cylinder 76 and the servo motors 80 and 81 corresponding to this speed difference to the serial communication interface 91.

The serial communication interface 91 is connected to the plunger control section 87, speed control section 90 and position sensor conversion section 92 and transmits various data Dn from the plunger control section 87 and the current designation signal (torque signal) TO from the speed control section 90 to the serial communication interfaces 78a, 84a and 85a of the valve control section 78 and the current control sections 84 and 85 through communication wiring. The serial communication interface 91 transmits also the phase signal PR from the position sensor conversion section 92 to the serial communication interfaces 84a and 85a of the current control sections 84 and 85 through communication wiring. The serial communication interface 91 and the serial communication interfaces 78a, 84a and 85a are multi-point connected to one another through bidirectional communication wiring so that various data Dn from the plunger control section 87 and data D5, DX and DY produced by the valve control section 78 and the current control sections 84 and 85 are exchanged between the plunger control section 87 and the valve control section 78 and the current control sections 84 and 85.

The valve control section 78 is of the same construction as the valve control sections 65 and 68 of FIG. 3 and have serial communication interface 78a, servo amplifier 78b and servo valve 78c.

The serial communication interface 78a is connected to the serial communication interface 91 and servo amplifier 78b of the position and speed control section 86. The serial communication interface 78a receives the current designation signal TO from the serial communication interface 91 through the serial communication interfaces 84a and 85a and supplies it as the current designation signal TP to the servo amplifier 78b and also transmits data D5 including a status signal representing the control state of the servo amplifier 78b to the serial communication interface 91.

The servo amplifier 78b is connected to the serial communication interface 78a and the servo value 78c, inputs the current designation signal TP and, in response thereto, drives a power transistor and supplies a drive current to the servo valve 78c.

The serial communication interface 78a is connected with the servo amplifier 78b through a data line so that the various data D5 is exchanged between them.

The servo amplifier 78b has a function of detecting the control state of the hydraulic cylinder 78, i.e., overloading, drop in the power voltage, overcurrent, overvoltage and overheating of the hydraulic cylinder 78 and has a memory for storing data including servo status data representing the control state, an ID code representing specification of the servo amplifier 78b, a cylinder specification code representing the specification of the hydraulic cylinder which is the object of control and a section number of the hydraulic cylinder.

Data stored in the memory of the servo amplifier 78b is supplied, when necessary, as the data Dn (D5), to the plunger control section 87 through data lines and the serial communication interfaces 78a, 85a, 84a and 91. The cylinder specification code is stored as a table in the memory.

Accordingly, by selecting a table number corresponding to the hydraulic cylinder connected through communication wiring, a hydraulic cylinder of a different specification can be selected as the hydraulic cylinder 78b and the plunger control section 87 can have data as to the section to which the plunger under control belongs. By this arrangement, even when the hydraulic cylinder has been replaced, the control system can be changed to one corresponding to the specification of the replaced hydraulic cylinder simply by changing the table number. It is also possible to stop the plunger control in a section in which malfunction has occurred.

The servo valve 78c controls the amount of opening of the valve for supplying hydraulic pressure to the hydraulic cylinder 76 in accordance with the current supplied from the servo amplifier 78b thereby controlling the moving speed and positioning of the plunger.

The current control section 84 is of the same construction as the current control section 66 and includes serial communication interface 84a and current control section 84b. Since the current control section 85 is of the same construction as the current control section 84, description thereof will be omitted.

The serial communication interface 84a is connected to the serial communication interface 91 of the position and speed control section 86 and the current control section 84b. The serial communication interface 84a receives the current designation signal (torque signal) TO and the phase signal PR from the serial communication interface 91 and supplies them as the current designation signal (torque signal) TX and the phase signal PS to the current control section 84b and transmits the various data DX including a status signal representing the control state of the current control section 84b to the serial communication interface 91.

The current control section 84b is connected to the serial communication interface 84a and the servo motor 80. The current control section 84b receives the current designation signal (torque signal) TX and the phase signal PS and, in response thereto, produces a 3-phase PWM signal to drive a power transistor and supplies a drive current to the respective phases (i.e., U-phase, V-phase and W-phase) of the servo motor 80. Thereupon, a current feedback signal T8 of current values of the U-phase and V-phase is fed back to the current control section 84b by the current detection isolator CT. The current control section 84b supplies a drive current obtained by amplifying difference between the current designation signal (torque signal) TX of each phase and the current feedback signal T8 of each phase.

The serial communication interface 84a is connected with the current control section 84b through a data line so that the various data DX is exchanged between them.

The current control section 84b has a function of detecting the control state of the servo motor 80, i.e., overloading, drop in the power voltage, overcurrent, overvoltage and overheating of the servo motor 80, and has a memory for storing various data including a servo status signal representing the control state, an ID code representing the current amplifier and a motor specification code representing the specification of the servo motor which is the object of control.

The data stored in the memory of the current control section 84b is supplied, when necessary, as the data Dn (DX) to the plunger control section 87 through the serial communication interfaces 84a and 91.

The motor specification code is stored as a table in the memory. Each of the current control sections 84b and 85b therefore detects whether the transmitted data is one for it or not and, when it is data for it, reads the data and performs a control corresponding to the data. When, for example, the data is one for driving the servo motor, a drive current is supplied to the servo motor on the basis of this data. When a table number representing the specification of the servo motor has been transmitted, the drive current of the current control sections 84b and 85b is changed to one corresponding to the specification of the servo motor in accordance with the table number.

As described above, according to the invention, the servo amplifier 78b and the current control sections 84b and 85b can be changed to ones which can control a hydraulic cylinder and servo motor of different specifications simply by selecting a table number corresponding to the specifications of the hydraulic cylinder 76 and the servo motors 80 and 81 connected through communication wiring. Accordingly, even when the hydraulic cylinder and the servo motor have been replaced, the servo amplifier and the current control sections can be changed to those corresponding to the replaced hydraulic cylinder and the servo motor simply by changing the table number.

Further, according to the above described embodiment, the current designation signal (torque signal) TO, phase data PR and various data Dn can be transmitted simultaneously from the serial communication interface 01 to the serial communication interface 78a of the valve control section 78 and the serial communication interfaces 84a and 85a of the current control sections 84 and 85 whereby the hydraulic cylinder 76 and the servo motors 80 and 81 can be simultaneously controlled. Since the respective shafts of the servo motors 80 and 81 are made to correspond to the X-axis and Y-axis, linear interpolation and arcuate interpolation between the two axes are made possible and, accordingly, registering of the center positions between the plunger and the blank mold is facilitated.

The operation of the plunger control system according to the present embodiment will now be described.

In the plunger control system of FIG. 4, data Dn (DX, DY and DZ) of a table number representing the specifications of the hydraulic cylinder 76 and the servo motors 80 and 81 is transmitted from the plunger control section 87 to the serial communication interface 78a of the valve control section 78 and the serial communication interfaces 84a and 85a of the current control sections 84 and 85 through the serial communication interface 91. The table number data thus transmitted in turn is transmitted to servo amplifier 78b and the current control sections 84b and 85b by the serial communication interfaces 78a, 84a and 85a. The servo amplifier 78b and the current control sections 84b and 85b thereby determine the specifications of the hydraulic cylinder 76 and the servo motors 80 and 81 and function as the servo amplifier and current control sections adapted to the specifications of the hydraulic cylinder 76 and the servo motors 80 and 81.

The plunger control section 87 supplies a position designation signal F3 designating target positions of the hydraulic cylinder 76 and the servo motors 80 and 81 to the position control section 89. The position control section 89 supplies the position designation signal F3 and a speed designation signal F4 based on position data P9 to the speed control section 90. The speed control section 90 supplies the speed designation signal F4 and a current designation signal TO (torque signal) corresponding to a speed signal F5 to the serial communication interface 91.

Transmission of data is made between the serial communication interface 91 and serial communication interfaces 78a, 84a and 85a and current designation signals (torque signals) TX, TY and TP and position t signals PS and PT are supplied from the serial communication interfaces 78a, 84a and 85a to the servo amplifier 78b and the current control sections 84b and 85b. The servo amplifier 78b controls a drive current of the servo valve 78c on the basis of the current designation signal TP. The current control sections 84b and 85b control a drive current for the servo motors 80 and 81 in response to the current designation signals (torque signals) TX and TY, current feedback signals T8 and T9 and phase signals PS and PT. Outputs PX, PY and PQ of the linear position detection device 77 and the rotational position detection devices 82 and 83 connected to the hydraulic cylinder 76 and the servo motors 80 and 81 and the rotational position detection devices 82 and 83 are fed back to the position conversion section 92 of the position and speed control section 86. The position data P9 therefore is fed back to the position control section 89 and a position loop thereby is formed. The speed signal F5 is fed back to the speed control section 90 and a speed loop thereby is formed.

The plunger control section 87 controls the movement of the hydraulic cylinder 76 and the rotation of the servo motors 80 and 81 by repeating the above described operation. Since the control of the servo motors 80 and 81 may be made within a short period of time between respective control periods for the hydraulic cylinder 76, the control of the servo motors 80 and 81 can be made simultaneously by a single plunger control section 87 by multi-point connecting the parison forming sections of FIG. 1 by bidirectional communication wiring.

When one of abnormal states such as overloading, drop in the power voltage, overcurrent, overvoltage and overheating has occurred, data of a status signal representing such control state is transmitted from the servo amplifier 78b and current control sections 84b and 85b to the serial communication interfaces 78a, 84a and 85a. This data of the status signal is transmitted to the plunger control section 87 through the serial communication interfaces 91. Upon receipt of the data, the plunger control section 87 performs a processing corresponding to the type of the status signal.

Figure 6:
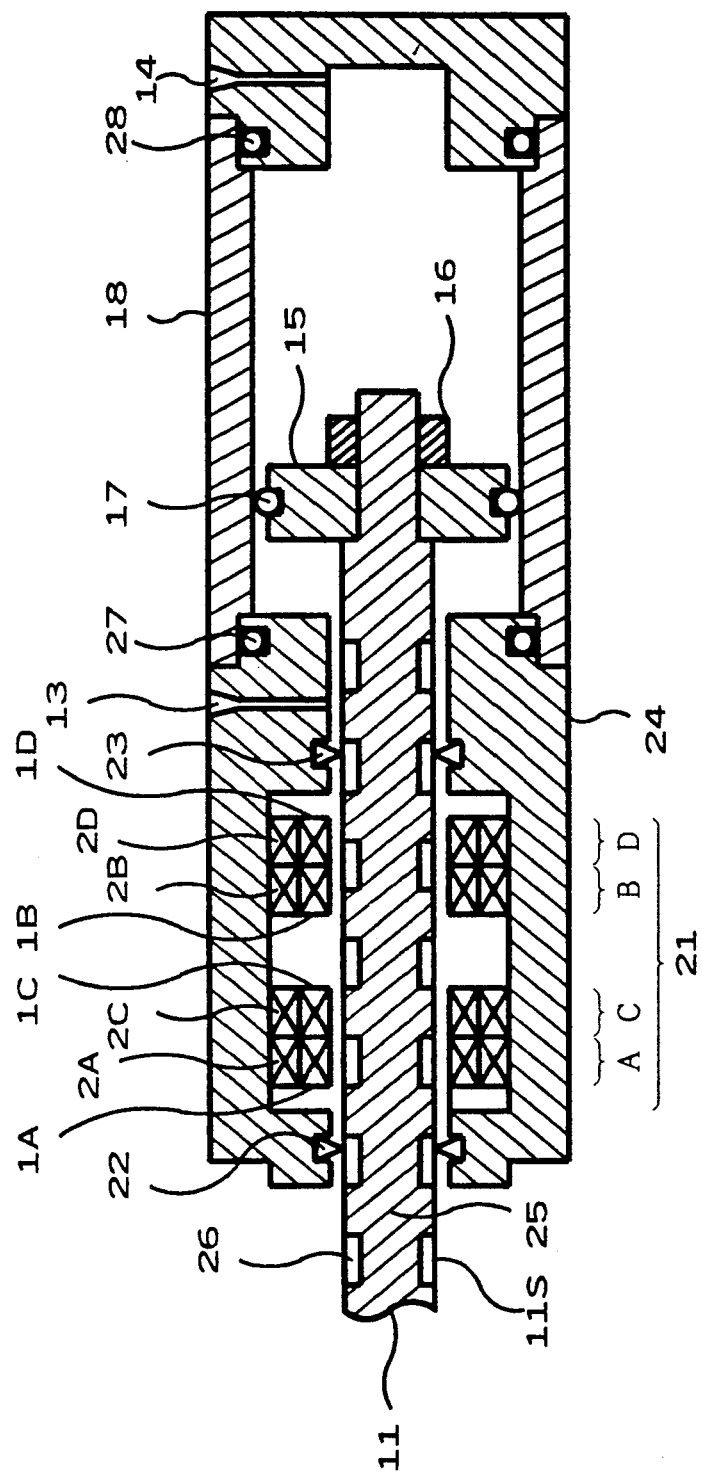
FIG. 6 is a diagram showing construction of the hydraulic cylinder and linear position detection device of FIGS. 2 and 4.

FIG. 6 shows a specific construction of the linear position detection devices 51 and 64 and the linear position detection device 77.

The linear position detection device detects the linear position of the cylinder rod of the hydraulic cylinder by a phase shift system and includes a coil assembly 21 and a cylinder rod 11 (corresponding to the cylinder rods 1c, 2c and 3c in FIG. 1) which has been subjected to a special processing.

The coil assembly 21 includes four primary coils 1A, 1C, 1B and 1D disposed at a predetermined interval in the axial direction of the cylinder rod 11 and secondary coils 2A, 2C, 2B and 2D disposed in correspondence to the primary coils 1A, 1C, 1B and 1D. The coil assembly 21 is fixed to a casing 24 in such a manner that a cylindrical space formed therein becomes concentrical with the cylinder rod 11.

The cylinder rod 11 is provided in the peripheral portion thereof with a magnetic graduation section 11S which consists of a magnetic substance portion 25 and a non-magnetic substance portions 26 consisting of rings of predetermined width which are arranged alternately with the magnetic substance portion 25 in the axial direction of the cylinder rod 11. These magnetic substance portion 25 and non-magnetic substance portion 26 may be made of any material if it can produce change in reluctance to a magnetic path formed in the coil assembly 21. For example, the non-magnetic substance portion 26 may be made of a non-magnetic material or air. Alternatively, the magnetic substance portion 25 and the non-magnetic substance portion 26 having different permeability from each other may be formed alternately by changing their magnetic properties by applying a laser baking to the cylinder rod 11 made of iron.

Assuming, for example, that the length of one coil is "P/2" (P being any number), the interval for one pitch in the alternate arrangement of the magnetic substance portion 25 and the non-magnetic substance portion 26 is "P". In this case, the length of the magnetic substance portion 25 and the length of the non-magnetic substance portion 26 may be equally "P/2" or may not be equal to each other.

In the present embodiment, the coil assembly 21 is constructed so that it will be operated with four phases. These four phases are distinguished from one another by reference characters A, C, B and D.

The positional relation between the cylinder rod 11 and the coil assembly 21 is so made that reluctance produced in the respective phases A to D in the coil assembly 21 differs by 90 degrees in accordance with the position of the magnetic substance portion 25 of the cylinder rod 11. Assuming, for example, that the phase A is a cosine (cos) phase, the phase C becomes a minus cosine ($-\cos$) phase, the phase B a sine (sin) phase and the phase D a minus sine ($-\sin$) phase, respectively.

In the embodiment of FIG. 6, the primary coils 1A, 1C, 1B and 1D and the secondary coils 2A, 2C, 2B and 2D are provided individually for the respective phases A to D. The secondary coils 2A, 2C, 2B and 2D of the respective phases A to D are wound on the outside of the corresponding primary coils 1A, 1C, 1B and 1D.

As described previously, the length of the primary coils 1A, 1C, 1B and 1D and the secondary coils 2A, 2C, 2B and 2D is "P/2". In the embodiment of FIG. 6, the coils 1A and 2A of the phase A are provided adjacent to the coils 1C and 2C of the phase C and the coils 1B and 2B of the phase B are provided adjacent to the coils 1D and 2D of the phase D. The coil interval between the coils of the phase A and those of the phase B or between the coils of the phase C and those of the phase D is "P ($n \pm \frac{1}{4}$)" (n being any natural number).

According to this construction, reluctance in the magnetic path in the respective phases A to D changes periodically with the distance "P2 being made one period in accordance with linear displacement of the cylinder rod 11 and the phase of the reluctance change can be made to differ by 90 degrees for each of the phases A to D. There is, therefore, phase difference of 180 degrees between the phase A and the phase C and also between the phase B and the phase D.

Figure 7:
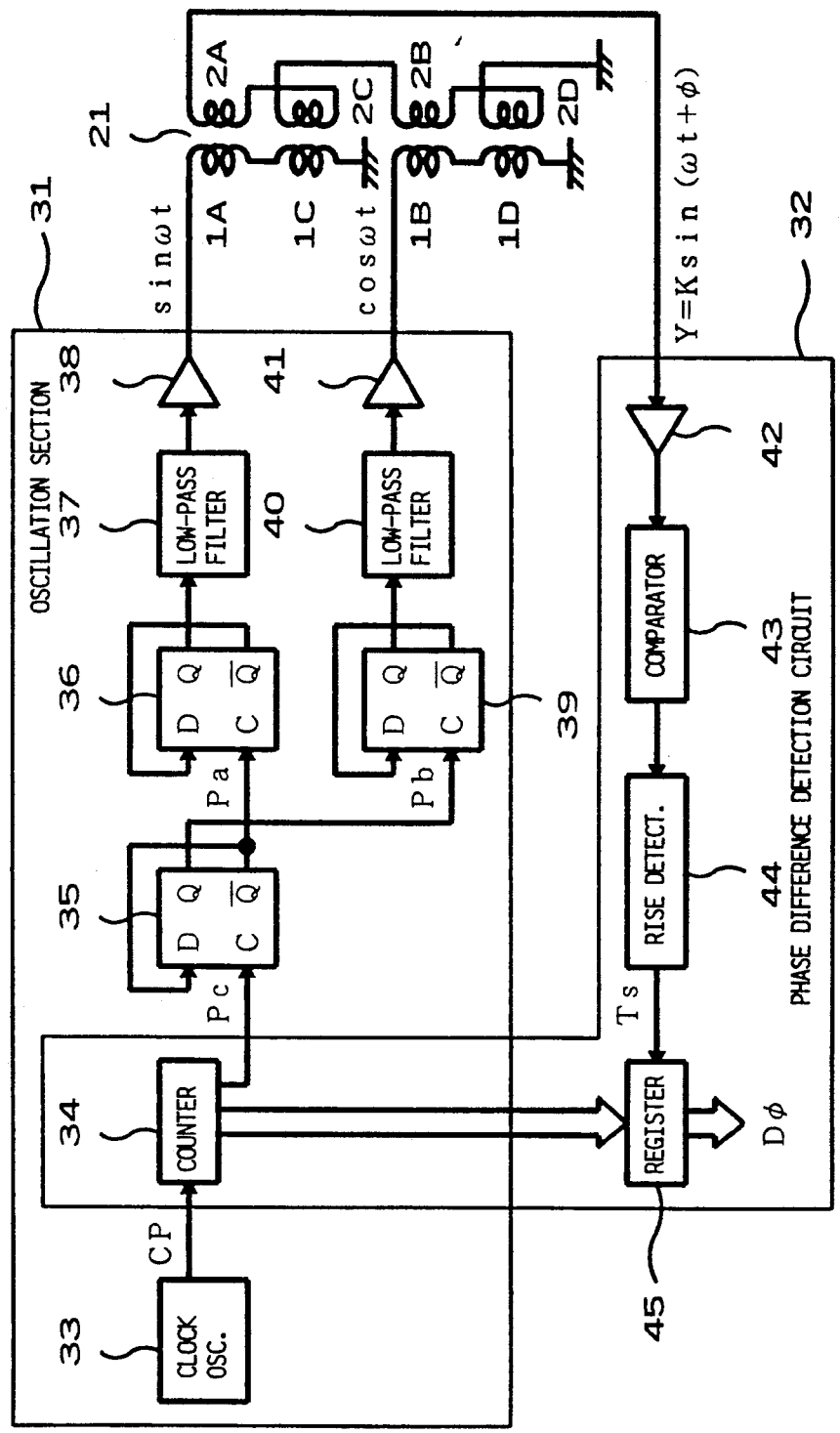
FIG. 7 is a diagram showing construction of the position sensor conversion section of FIGS. 3 and 5.

An example of connection of the primary coils 1A, 1C, 1B and 1D and the secondary coils 2A, 2C, 2B and 2D is shown in FIG. 7. In the connection of FIG. 7, the primary coils 1A and 1C of the phases A and C are excited by a sine signal $\sin \omega t$ in the same phase and outputs of the secondary coils 2A and 2C are added together in opposite phases. Likewise, the primary coils 1B and 1D of the phases B and D are excited in the same phase by a cosine signal $\cos \omega t$ and outputs of the secondary coils 2B and 2D are added together in opposite phases. Outputs of the secondary coils 2A, 2C, 2B and 2D are finally added together and a sum signal is applied as an output signal Y to a phase difference detection circuit 32.

This output signal Y is a signal obtained by phase-shifting a reference ac signals ($\sin \omega t$, $\cos \omega t$) by a phase angle $\phi$ corresponding to the linear position of the magnetic substance portion 25 of the cylinder rod 11. The reason is that reluctance of the phases A to D is different by 90 degrees for each phase and the electrical phase of the exciting signal for one pair (A, C) is different from the exciting signal for the other pair by 90 degrees. Accordingly, the output signal Y becomes $Y = k \sin(\omega t + \phi)$ (K being a constant).

The phase $\phi$ of the reluctance change is proportionate to the linear position of the magnetic substance portion 25 in accordance with a predetermined proportion coefficient (or function) and, therefore, the linear position can be detected by measuring the phase difference $\phi$ of the output signal Y from the reference signal $\sin \omega t$ (or $\cos \omega t$). When the amount of phase difference $\phi$ is the whole angle $2\pi$, the linear position corresponds to the above described distance P. Alternatively speaking, the linear position in an absolute value within the distance P can be detected by the amount of electrical phase difference $\phi$ in the output signal Y. By measuring this amount of electrical phase difference $\phi$, the linear position within the distance P can be detected with a sufficiently high resolution.

As the magnetic graduation section 11S in the rod 11, not only the magnetic substance portion 25 and the non-magnetic substance portion 26 but other material which can produce reluctance change may be employed. For example, the magnetic graduation section 11S may be formed by a combination of a high conductive material such as copper and a low conductive material such as iron (this may be a non-conductive material), i.e., materials of different conductivity and reluctance change corresponding to eddy current loss may thereby be produced. In this case, a pattern of a good conductivity may be formed on the surface of the rod 11 made of, e.g., iron. The pattern may be of any shape so long as it can produce reluctance change effectively.

An arrangement may be suitably made for obtaining the amount of phase difference $\phi$ between the output signal Y and the reference signal $\sin \omega t$ (or $\cos \omega t$). FIG. 7 shows an example of a circuit including the position sensor conversion sections 74 and 92 of FIGS. 3 and 5 wherein the phase difference amount $\phi$ is obtained as a digital amount.

In FIG. 7, an oscillation section 31 generates the reference sine signal $\sin \omega t$ and the reference cosine signal $\cos \omega t$. A phase difference detection circuit 32 measures the phase difference amount.

A clock pulse CP generated by a clock oscillator 33 is counted by a counter 34. The counter 34 is, e.g., of a modulo M and its count value is supplied to a register 45. From a 4/M frequency-divided output of the counter 34 is provided a clock pulse Pc which is a 4/M frequency-divided clock pulse of the clock pulse CP. This clock pulse Pc is supplied to a C input of a flip-flop 35.

A pulse Pb provided from a Q output of the flip-flop 35 is applied to a flip-flop 39 and a pulse Pa provided from a *Q output (the sign * represents an inverted output) is applied to a flip-flop 36. Outputs of the flip-flops 36 and 39 are supplied to the coil assembly 21 as a sine signal $\sin \omega t$ and a cosine signal $\cos \omega t$ through low-pass filters 37 and 40 and amplifiers 38 and 41.

Count M in the counter 34 corresponds to a phase angle of $2\pi$ radian of the reference signals $\sin \omega t$ and $\cos \omega t$. That is, one count of the counter 34 represents a phase angle of $2\pi/M$ radian.

The output signal Y of the coil assembly 21 is applied to a comparator 43 through an amplifier 42 and a square wave signal corresponding to the positive or negative polarity of the output signal Y is produced by the comparator 43. In response to rising of this output signal from the comparator 43, a pulse Ts is provided by a rise detection circuit 44 and the count of the counter 34 is written in a register 45 in response to this pulse Ts. As a result, a digital value D$\phi$ corresponding to the phase difference amount $\phi$ is loaded in the register 45. The linear position of the cylinder rod 11 can thereby be detected in an absolute value and with high accuracy.

Figure 8:
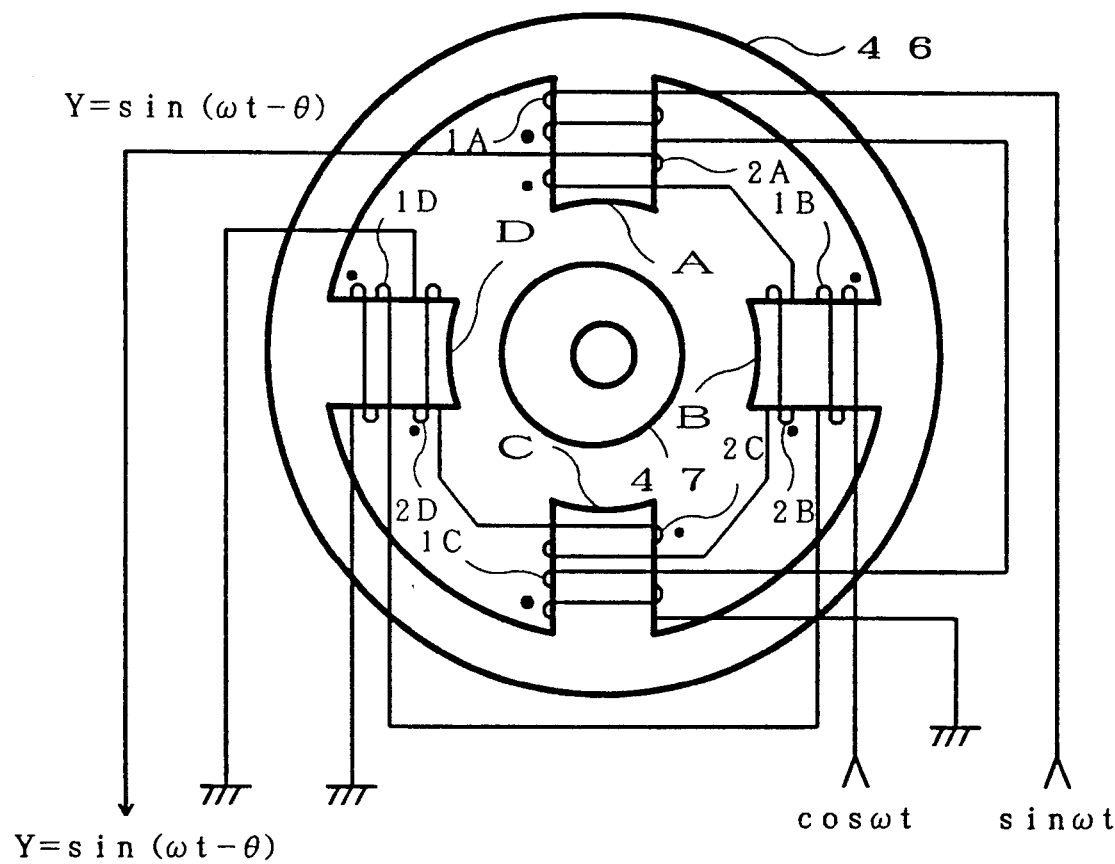
FIG. 8 is a diagram showing construction of the rotational position detection device of FIGS. 2 and 4.

FIG. 8 shows a specific construction of the rotational position detection devices 56 and 62 of FIG. 2 and the rotational position detection devices 82 and 83 of FIG. 4. Each of the rotational position detection devices is made of an absolute type position sensor consisting of an induction type position-shifting position sensor. Details of this position sensor are described in Japanese Patent Laid-open Publication No. 57-70406 or Japanese Patent Laid-open Publication No. 58-106691 and only a brief description thereof will be made below.

The rotational position detection device includes a stator 46 having poles A, B, C and D disposed in the circumferential direction with a predetermined interval (e.g., 90 degrees) and a rotor 47 inserted in the central space of the stator 46 defined by the poles A to D of the stator 46. Since these poles A to D correspond to the phases A to D in FIG. 6, the same reference characters are used.

The rotor 47 is made in a shape and of a material which will produce a reluctance change in the respective poles A to D in accordance with the angle of rotation. For example, the rotor 47 is made in an offset cylindrical shape as shown in FIG. 8. Primary coils 1A to 1D and secondary coils 2A to 2D are respectively wound on the poles A to D of the stator 46. These coils are wound in such a manner that the first pair of poles A and C is operated differentially from the second pair of poles B and D thereby to produce differential reluctance change.

The primary coils 1A and 1C wound on the first pair of poles A and C are excited by the sine signal $\sin \omega t$ and the primary coils 1B and 1D wound on the second pair of poles B and D are excited by the cosine signal $\cos \omega t$. As a result, a composite output signal Y is provided from the secondary coils 2A to 2D. This composite output signal Y is a signal $Y = \sin(\omega t - \theta)$ which is obtained by phase-shifting the primary reference ac signal (i.e., the exciting signal for the primary coils) $\sin \omega t$ or $\cos \omega t$ by an electrical phase angle corresponding to the rotation angle of the rotor 47.

When the induction type phase shifting rotational position detection device as described above has been employed, therefore, it is necessary to have an oscillation circuit for generating the primary ac signal $\sin \omega t$ or $\cos \omega t$ and a phase difference detection circuit for measuring the electrical phase difference of the composite output signal Y and calculates position data of the rotor. As the oscillation circuit of the primary ac signal and the phase difference detection circuit, those of FIG. 7 may be employed.

The operation of the present embodiment will be described with reference to the time chart of FIG. 9.

Figure 9:
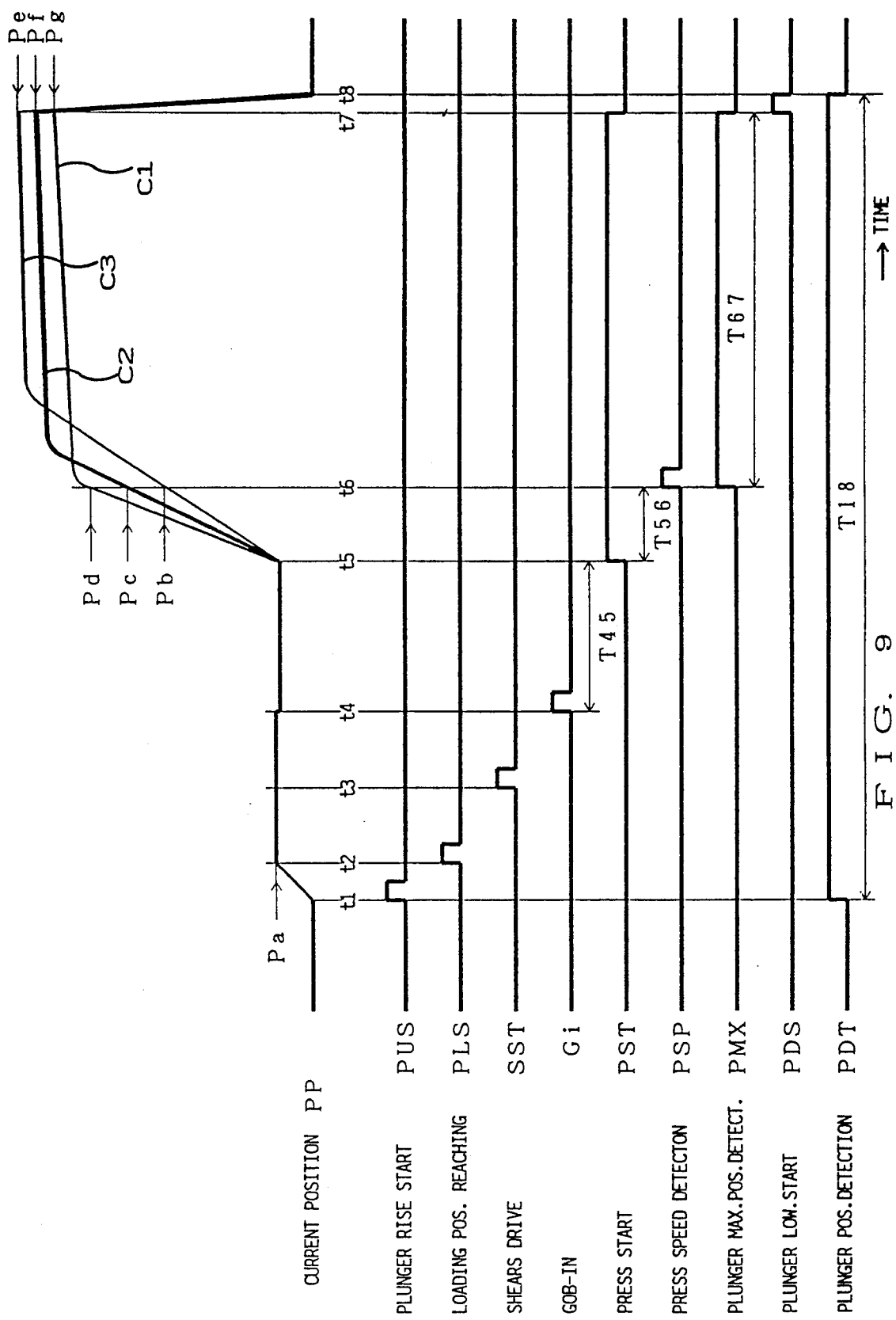
FIG. 9 is a time chart for describing the operation of the machine according to the invention.

In FIG. 9, a current position signal PP represents current position of the plunger 1g. Curves C1, C2 and C3 show variation in the current position signal PP when gobs of equal weight and different temperatures have been set in the blank mold 1i. The temperature of the gob becomes higher in the order of C1, C2 and C3.

Description will be made starting from the state in which the plunger 1g is at a standstill at the initial position and in the order of time t1 to t8.

Time t1: The plunger control section 87 provides a target stop position (loading position) Pa to the position control section 89 in response to generation of a plunger rise start signal PUS. The plunger 1g gradually rises from the initial position to the loading position Pa.

Time t2: This is time when the plunger 1g has reached the loading position Pa. The current position data PP and a loading position reaching signal PLS are supplied from the plunger control section 87 to the gob weight control section 70. The gob weight control section 70 starts supply of gobs in response to this loading position reaching signal PLS.

Time t3: A shears drive signal SST is provided by the gob weight control section 70 and forming of a gob is thereby started. Before generation of the shears drive signal SST, the gob weight control section 70 produces a clay plunger drive signal.

Time t4: By passage of a gob which has been formed by the gob forming section through the gob distribution section, the gob passage detection section 88 supplies the gob-in signal Gi to the plunger control section 87. At this moment, the value of the plunger current position signal PP is slightly reduced. The plunger 1g in FIG. 1 shows this state. The plunger control section 87, therefore, detects that a gob has been set in the blank mold by the generation of the gob-in signal Gi. Alternatively, the gob-in may be detected by decrease in the value of the plunger current position signal PP. The plunger 1g maintains this state from the time t4 when the gob 1h has reached the plunger 1g until lapse of a predetermined period of time T45. This arrangement is made for causing the plunger 1g to wait from a time point at which the gob 1h has reached the plunger 1g till a time point at which the baffle plate 2j has been completely set in the blank mold before the gob which has gradually spreaded in the space between the plunger 1g and the blank mold 1i bulges out of the blank mold 1i. Since a gob of a high temperature is low in viscosity and quick in spreading, the predetermined time T45 is set at a shorter time length than in the case of a gob of a low temperature. Description herein will be made about a case where this predetermined time T45 is constant.

Time t5: This is a time point at which the baffle plate 2j has been completely set in the blank mold. A press start signal PST is produced and the plunger drive section 1a thereby starts pressing by plunger 1g.

Time t6: After starting of pressing, the plunger control section 87 detects the current position of the plunger 1g in response to a press speed detection signal PST upon lapse of a predetermined period of time T56. The current position at this time is a value which depends upon the temperature of each gob. More specifically, since a gob of a high temperature is low in viscosity, the curve C1 shows a large current position Pd at time t6 whereas a gob of a low temperature is high in viscosity so that the curve C3 shows a small current position Pb. The curve C2 shows a case where the gob is of a middle temperature. Accordingly, by the current position of the plunger 1g detected by the press speed detection signal PSP, the temperature of the gob in the blank mold 1i can be detected.

Further, since a gob of a low temperature has a smaller volume than a gob of a high temperature, the maximum stroke value of the plunger 1g depends upon temperature even when gobs of the same weight are pressed by the plunger 1g. More specifically, a gob of a high temperature is large in volume so that the plunger current position shows a large current position Pd at time t6 in the curve C1 but the maximum stroke value of the plunger becomes a small value of Pg. Conversely, a gob of a low temperature is small in volume so that the plunger current position shows a small current position Pb at time t6 in the curve C3 but the maximum stroke value of the plunger becomes a large value of Pe. Since the curve C2 represents a middle temperature, the maximum stroke value becomes a middle value Pf. Accordingly, the gob weight control section 87 detects the gob temperature in the blank mold 1i by the current position signal PP of the plunger 1g detected by the press speed detection signal PSP, corrects the maximum stroke value of the plunger in accordance with the gob temperature and controls the gob weight on the basis of the corrected maximum stroke t value. The maximum stroke position of the plunger is reached during a time period T67 when a plunger maximum position detection signal PMX is produced.

Time t7: The plunger control section 87 restores the plunger to the initial position and stops it in response to a plunger lowering start signal.

The plunger control section repeats the above described operation. The plunger position detection operation is made during time T18 when the plunger position detection signal PDT is produced, i.e., during a time period from a rise point t1 of a plunger rise start signal PUS and a fall point t8 of the plunger lowering start signal PDS.

Figure 10:
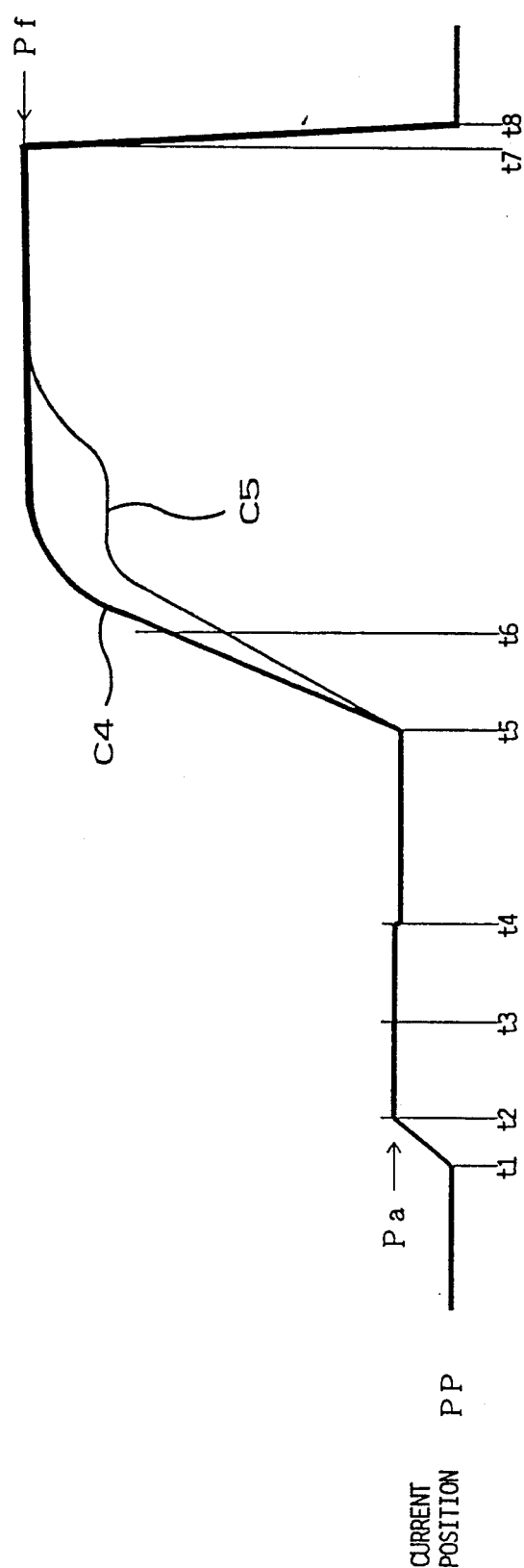
FIG. 10 is a graph showing the current position of the plunger in registering the center positions of the plunger and the blank mold.

FIG. 10 shows a plunger current position signal in the case of registering the center positions between the plunger and the blank mold.

In the figure, curve C4 shows a current position signal PP when the center positions of the plunger and the blank mold are in alignment and curve C5 shows a current position PP when the center positions of the plunger and the parison are not in alignment. In the case of the curve C5 in which the center positions are not in alignment, there occurs a portion in which the current position does not rise in a section between time t5 at which the press start signal PST is produced and time at which the maximum stroke value Pf is reached, i.e., change in the press speed of the plunger. This is a there occurs phenomenon caused by contact of the plunger with the inner wall of the blank mold or by rising of the plunger in the vicinity of the inner wall of the blank mold due to the non-alignment of the center positions of the plunger and the blank mold. In the event that such phenomenon has occurred in the press speed of the plunger, therefore, the servo motors 80 and 81 are driven to move the plunger on the X-Y plane so as to prevent such change in the press speed, i.e., so as to cause the current position signal PP to follow the curve C4. Registering of the center positions between the plunger and the blank mold can thereby be realized.

At a time point when the gob weight control and the registering of the center positions have been completed, the hydraulic cylinder 76 may be positively controlled so that the movement of the plunger will follow the ideal curve C4. In the above described embodiment, driving of the hydraulic cylinder 76 is started in response to the press start signal PST and the hydraulic cylinder 76 is driven with a constant current until the gob has been filled in the space between the blank mold and the plunger and the plunger has stopped. Instead, the target position signal may be supplied to the position and speed control section 86 in accordance with the curve C2 of FIG. 9 or the curve C4 of FIG. 10 so as to cause the plunger to follow the curve C2 or C4. At this time, the target position signal may be changed in accordance with the temperature Tg of the molten glass. Further, a pneumatic cylinder having a built-in brake may be employed instead of the hydraulic cylinder 76 so that the target position control will be made by the on-off control of the brake.

The above description has been made about a case where the gob weight control system and the plunger control system are separated from each other. These systems however may be integrated together. More specifically, the function of the plunger control section 87 may be incorporated in the gob weight control section 70 and the current control sections 84 and 85 and the valve control section 78 may be connected to the position and speed control section 69 through a bidirectional communication wiring.

In the above described embodiment, description has been made about the case where the operation timing of the shears 3, the height of the clay tube 4 and the position and speed of the movement of the clay plunger 5 are controlled. As shown in FIG. 4, the shears 3, clay tube 4 and clay plunger 5 may be moved on the X-Y plane by using the servo motor to perform registering of the center positions of these components.

In the above described embodiment, the temperature and the height of the surface level of the molten glass in the spout 1 are detected and the gob weight is controlled in accordance with the detected temperature and height. Alternatively, means for maintaining the temperature and the height of the surface level of the molten glass in the spout 1 at constant values may be provided. For example, the glass may be heated by a gas burner 94 provided around the spout 1 and cooled by air from an air supply 95 in FIG. 2.

In the above described embodiment, the hydraulic valve and the servo motor are used as the drive means. Other drive means may of course be employed. The hydraulic valve may be replaced by a pneumatic valve. The hydraulic valve may be replaced by a servo motor or the servo motor may be replaced by a hydraulic valve.

In the above described embodiment, the novel serial communication system which can be constructed of an inexpensive and simple hardware and data can be transmitted at a high speed is employed. Details of this serial communication system are described in Japanese Patent Application No. 2-49640 filed by the same assignee as the present application so that description thereof will be omitted.

In the above described embodiment, the hydraulic valves are used as the plunger drive means and the shears drive means. Alternatively, a clay plunger cam and a shears cam may be used as in the conventional machines. In that case, the rotational position detection device may be connected to the clay plunger cam and the shears cam to control the rotational position. In the present embodiment, however, the stroke of movement of the hydraulic valve can be altered as desired but in the case of using the clay plunger cam and the shears cam, the entire cams must be replaced when it is desired to alter the stroke of movement is desired.

The servo motor is not limited to the synchronizing type servo motor but an induction type AC servo motor may be used as well. In that case, generation of a phase signal is not necessary. AS the servo motor, not only an AC servo motor but other type of servo motor such as a DC servo motor may be used. As the linear position detection devices and the rotational position detection devices, not only an induction type phase shifting sensor but other types of sensor such as an optical absolute encoder and incremental encoder may be used.

The communication wiring is not limited to an electric cable but an optical cable may be used.

As described above, according to the invention, causes of defects occurring during manufacture of glass bottles can be completely eliminated in the stage of forming parisons.

What is claimed is:

1. A glass bottle forming apparatus comprising:
   gob forming means for forming a gob of molten glass;
   gob supply means for supplying the gob formed by the gob forming means;
   parison forming means for forming the gob supplied by said gob supply means into a parison, said parison forming means having a mold for receiving the supplied gob and a plunger moveable in said mold for pressing the gob in said mold to form the parison;
   plunger position detection means for successively detecting varying positions of said plunger while the plunger moves in said mold and for generating position detection data;
   gob weight estimation means for estimating the weight of the gob which has been supplied detection data obtained by said detection means; and
   gob weight control means for controlling the gob forming means so that the gob weight estimated by the gob weight estimation means becomes a predetermined weight. H 2. A glass bottle forming apparatus as defined in claim 1 wherein said gob weight estimation means includes
   speed detection means for detecting a speed of a pressing action by said plunger as a function of said position detection data which successively change during the pressing action,
   temperature estimation means for estimating a temperature of the gob as a function of the speed of the pressing action detected by said speed detection means, and
   maximum stroke detection means for detecting a maximum stroke position of said plunger as a function of said position detection data, and
   said gob weight estimation means estimates the gob weight as a function of the estimated temperature and the detected maximum stroke position.

3. A glass bottle forming apparatus as defined in claim 1 which further comprises a temperature sensor for sensing a temperature of the molten glass in said gob forming means and in which said gob weight estimation means includes maximum stroke detection means for detecting a maximum stroke position of said plunger as a function of said position detection data, and said gob weight estimation means estimates the gob weight as a function of the temperature sensed by said temperature sensor and the maximum stroke position detected by said maximum stroke detection means.

4. A glass bottle forming apparatus as defined in claim 1 wherein the gob forming means includes a spout, wherein the glass bottle forming apparatus further comprises height detection means for detecting a height of the surface level of the molten glass stored in the spout and wherein said gob weight control means controls the gob forming means so that the gob weight becomes the predetermined weight as a function of the gob weight estimated by said gob weight estimation means and the height of the surface level detected by the height detection means.

5. A glass bottle forming apparatus as defined in claim 1 wherein said gob forming means includes a spout for storing molten glass, an orifice formed in said spout, a tube moveable within said spout, a pushing member moveable linearly in said tube to push the molten glass in the spout out of the orifice, shears for cutting the pushed out molten glass to form the gob of the molten glass, tube height control means for controlling the height of the tube from the bottom of the spout, pushing member control means for controlling a moving position and a moving speed of the pushing member, and shears control means for controlling an operation timing of the shears; and
   wherein said gob weight control means controls the gob weight by controlling at least one of said tube height control means, pushing member control means and shears control means.

6. A glass bottle forming means as defined in claim 5 wherein said tube height control means comprises:
   a tube holder for holding the tube;
   a rotary shaft for moving the tube holder vertically by rotation thereof, thereby changing the height of the tube from the bottom surface of the spout;
   a servo motor for rotating the rotary shaft;
   shaft rotational position detection means for detecting a rotational position of the rotary shaft;
   tube position control means for inputting a rotational position signal from the shaft rotational position detection means and a target position signal indicating the height of the tube for controlling the gob weight, and outputting a control signal in response to these input signals; and
   shaft current control means for supplying a drive current to the servo motor in accordance with the control signal from the tube position control means.

7. A glass bottle forming apparatus as defined in claim 6 wherein said shaft rotational position detection means is an absolute type position sensor detecting the position of the servo motor in an absolute position which includes a phase shift type position sensor having a wound section and a member which displaces relative to the wound section and thereby changes reluctance in the wound section in accordance with the relative position between the member and the wound section, and exciting the wound section by plural primary ac signals which are different in phase from one another to generate an output ac signal having an electrical phase difference corresponding to the absolute position of the servo motor.

8. A glass bottle forming apparatus as defined in claim 5 wherein said pushing member control means comprises:
   a hydraulic or pneumatic pushing cylinder for driving the pushing member in a linear movement;
   pushing member linear position detection means for detecting the linear position of the pushing cylinder;
   pushing member position speed control means for inputting a linear position signal from the pushing member linear position detection means and the pushing member target position speed signal for controlling the gob weight, and outputting a control signal in accordance with these input signals; and
   valve control means for driving the pushing cylinder in response to the control signal from the pushing member position speed control means. 1

9. A glass bottle forming apparatus as defined in claim 8 wherein said pushing member linear position detection means comprises:

a coil section having at least a primary coil which is excited by a predetermined ac signal;

a magnetic graduation section provided in the axial direction of a rod connected to the pushing member so that reluctance in a magnetic path of the coil section is changed in accordance with the movement of the rod; and a position detection circuit for taking out data indicating a position of the rod from the coil section in response to reluctance change in the magnetic path of the coil section which is produced by a relative positional relation between the magnetic graduation section and the coil section.

10. A glass bottle forming means as defined in claim 5 wherein said shears control means comprises:

a hydraulic or pneumatic shears driving cylinder for driving the shears in a linear movement;

shears linear position detection means for detecting the linear position of the shear driving cylinder;

shears position control means for inputting a linear position signal from the shears linear position detection means and the shears target position signal for controlling the gob weight, and outputting a control signal in accordance with these input signals; and valve control means for driving the shears driving cylinder in response to the control signal from the shears position control means.

11. A glass bottle forming apparatus as defined in claim 10 wherein said shear linear position detection means comprises:

a coil section having at least a primary coil which is excited by a predetermined ac signal;

a magnetic graduation section provided in the axial direction of a rod interlocked with the shear driving cylinder so that reluctance in a magnetic path of the coil section is changed in accordance with the movement of the rod; and a position detection circuit for taking out data indicating a position of the rod from the coil section in response to reluctance change in the magnetic path of the coil section which is produced by a relative positional relation between the magnetic graduation section and the coil section.

12. A glass bottle forming apparatus as defined in claim 5 further comprising tube rotation control means which comprises:

a tube driving motor for rotating the tube;

tube rotational speed detection means for detecting a rotational speed of the tube driving motor;

tube rotational speed control means for inputting a rotational speed signal form the tube rotational speed detection means and the tube target rotational speed signal for controlling the gob weight, and outputting a control signal in accordance with these input signals; and tube current control means for supplying a drive current to the tube driving motor in accordance with the control signal from the tube rotational speed control means.

13. A glass bottle forming apparatus as defined in claim 5 wherein at least two of said tube height control means, said pushing member control means and said shears control means are connected to each other through bidirectional communication wiring and these means are controlled by the same position speed control means.

14. A glass bottle forming apparatus as defined in claim 1 further comprises gob-in detection means for detecting that the gob has been supplied from the gob supply means to the parison forming means and generating a detection signal in response to the detection, and wherein the pressing action by the plunger in the parison forming means is started upon lapse of a predetermined length of time from generation of the detection signal by the gob-in detection means.

15. A glass bottle forming apparatus as defined in claim 14 wherein said gob-in detection means detects that the gob has been supplied to the parison forming means by optically detecting a passage of the gob being supplied from the gob supply means to the parison forming means.

16. A glass bottle forming apparatus as defined in claim 14 wherein said gob-in detection means detects that the gob has been supplied to the parison forming means by a change in the position detected by the plunger position detection means when the gob is supplied from the gob supply means to the parison forming means.

17. A glass bottle forming apparatus as defined in claim 14 wherein said predetermined length of time is determined in accordance with the temperature of the gob supplied to the parison forming means.

18. A glass bottle forming apparatus as defined in claim 1 which further comprises plunger control means for controlling the movement of the plunger with respect to a given target position data and the position detection data obtained by said plunger position detection means.

19. A glass bottle forming apparatus as defined in claim 18 wherein said plunger control means comprises:

a fluid powered actuator for driving the plunger in a linear movement;

comparison means for comparing the given target position data with the position protection data obtained by said plunger position detection means;

position and speed control signal generating means for generating position and speed control signals in accordance with an output of said comparison means; and actuator control valve means operable in accordance with the position and speed control signals for controlling said actuator.

20. A glass bottle forming apparatus as defined in claim 1 wherein said plunger position detection means comprises:

a coil section having at least a primary coil which is excited by a predetermined ac signal;

a magnetic graduation section provided in the axial direction of a rod connected to the plunger so that reluctance in a magnetic path of the coil section is changed in accordance with the movement of the rod; and a position detection circuit for taking out data indicating a position of the rod from the coil section in response to reluctance change in the magnetic path of the coil section which is produced by a relative positional relation between the magnetic graduation section and the coil section.

21. A glass bottle forming apparatus as defined in claim 20 wherein said coil section has plural primary coils and secondary coils, and said position detection circuit comprises:

a circuit for exciting the primary coils individually by reference ac signals which are different in phase from one another;

an output circuit for summing outputs of the secondary coils corresponding to the respective primary coils and generating an output signal which is obtained by phase shifting the reference ac signals in accordance with a relative linear position of the rod; and a circuit for detecting a phase difference between a predetermined one of the reference ac signals and the output signal from the output circuit and outputting the detected phase difference data as the rod position data.

22. A glass bottle forming apparatus as defined in claim 1 which further comprises:

position error detection means for detecting a difference between center positions of the mold and the plunger in the parison forming means as a function of the position detection data obtained by the plunger position detection means; and position registering means for registering the mold and the plunger to eliminate the difference between the center positions thereof.

23. A glass bottle forming apparatus as defined in claim 22 wherein said position registering means comprises:

a position registering servo motor for moving the plunger in an X-axis direction and a Y-axis direction on an X-Y plane which is perpendicular to the moving direction of the plunger;

motor rotational position detection means for detecting a rotational position of the position registering servo motor;

plunger position and speed control means for inputting a rotational position detection means and a plunger target position signal, and outputting a control signal in accordance with these input signals; and position registering current control means for supplying a drive current to the position registering servo motor in accordance with the control signal from the plunger position and speed control means.

24. A glass bottle forming machine as defined in claim 22 wherein said position error detection means detects the difference in the center positions by a change in the position detection data.

* * * * *